United States Patent
Palumbo et al.

(10) Patent No.: US 10,414,865 B2
(45) Date of Patent: Sep. 17, 2019

(54) AMPHOTERIC POLYMERS AND USE IN INKJET INK COMPOSITIONS

(71) Applicant: Cabot Corporation, Boston, MA (US)

(72) Inventors: Paul S. Palumbo, West Newton, MA (US); Jinqi Xu, Westford, MA (US)

(73) Assignee: Cabot Corporation, Boston, MA (US)

( * ) Notice: Subject to any disclaimer, the term of this patent is extended or adjusted under 35 U.S.C. 154(b) by 118 days.

(21) Appl. No.: 15/573,309

(22) PCT Filed: May 13, 2016

(86) PCT No.: PCT/US2016/032525
§ 371 (c)(1),
(2) Date: Nov. 10, 2017

(87) PCT Pub. No.: WO2016/187059
PCT Pub. Date: Nov. 24, 2016

(65) Prior Publication Data
US 2018/0105646 A1    Apr. 19, 2018

Related U.S. Application Data

(60) Provisional application No. 62/162,254, filed on May 15, 2015.

(51) Int. Cl.
| | | |
|---|---|---|
| C08G 73/02 | (2006.01) | |
| C09B 67/00 | (2006.01) | |
| C09C 3/10 | (2006.01) | |
| C09D 11/10 | (2014.01) | |
| C09D 11/326 | (2014.01) | |
| C08G 73/06 | (2006.01) | |
| C08L 79/02 | (2006.01) | |
| C09B 67/46 | (2006.01) | |
| C09D 11/322 | (2014.01) | |

(52) U.S. Cl.
CPC ....... *C08G 73/024* (2013.01); *C08G 73/0253* (2013.01); *C08G 73/0273* (2013.01); *C08G 73/0633* (2013.01); *C08L 79/02* (2013.01); *C09B 67/00* (2013.01); *C09B 67/009* (2013.01); *C09B 68/41* (2013.01); *C09C 3/10* (2013.01); *C09D 11/10* (2013.01); *C09D 11/322* (2013.01); *C09D 11/326* (2013.01); *C08G 2650/20* (2013.01)

(58) Field of Classification Search
CPC .............. C08G 73/024; C08G 73/0253; C08G 73/0206; C08G 75/20; C09B 67/009
See application file for complete search history.

(56) References Cited

U.S. PATENT DOCUMENTS

| | | | |
|---|---|---|---|
| 7,951,854 B2 | 5/2011 | Yanagi et al. | |
| 8,021,471 B2 * | 9/2011 | Palumbo | C09B 67/0009 106/31.58 |
| 8,815,979 B2 * | 8/2014 | Roberts | C09D 11/324 347/1 |
| 8,845,086 B2 | 9/2014 | Tallant et al. | |
| 8,927,624 B2 * | 1/2015 | Tallant | B01J 13/14 523/160 |
| 9,028,056 B1 | 5/2015 | Naruse et al. | |
| 9,217,089 B2 | 12/2015 | Nagai et al. | |
| 2007/0100023 A1 | 5/2007 | Burns et al. | |
| 2008/0257190 A1 * | 10/2008 | Thiem | C08G 73/0206 101/492 |
| 2011/0003241 A1 * | 1/2011 | Kaneko | C08G 73/0206 430/7 |
| 2013/0102729 A1 | 4/2013 | Li et al. | |
| 2013/0123426 A1 * | 5/2013 | Clarke | C09D 11/326 524/871 |
| 2013/0210999 A1 | 8/2013 | Xu et al. | |
| 2014/0013996 A1 * | 1/2014 | Dikan | C08K 3/04 106/31.9 |
| 2015/0329674 A1 * | 11/2015 | Shirota | C08G 65/333 528/332 |
| 2015/0353761 A1 * | 12/2015 | Nguyen | C09D 163/00 523/400 |

FOREIGN PATENT DOCUMENTS

| | | |
|---|---|---|
| EP | 0980862 A1 | 2/2000 |
| JP | 2015-081273 A | 4/2015 |
| JP | 2015-086237 A | 5/2015 |
| WO | WO 03/033604 A1 | 4/2003 |

OTHER PUBLICATIONS

The International Search Report and the Written Opinion of the International Searching Authority, or the Declaration for International Application No. PCT/US2016/032525, dated Sep. 6, 2016.

* cited by examiner

*Primary Examiner* — Michael M Dollinger

(57) ABSTRACT

Disclosed herein are inkjet ink compositions comprising a polymer comprising the repeat units (A), (B), and (C), wherein: (A) is selected from $—N^+(R_1)(R_2)—$ and $—N(R_1)—$; (B) is selected from $C_1$-$C_{10}$ alkylene; $C_3$-$C_{20}$ cycloalkylene; $C_3$-$C_{20}$ heterocycloalkylene; arylene; heteroarylene; $C_2$-$C_{20}$ ether; $C_2$-$C_{20}$ thioether; $C_2$-$C_{20}$ ester; $C_2$-$C_{20}$ acetal; $C_2$-$C_{20}$ amide; bisphenols; and oligomer and polymer moieties selected from polyether, polyester, polyamines, polycarbonate, polyacetal, polythioether, polyester amide, polyurethane, polyacrylate, polyolefin, and polyalkylsiloxane, and (C) comprises at least one group selected from: (i) $—C(R_3)(R_4)—C(R_5)(OH)—(C(R_6)(R_7))_m—$, (ii) $—C(R_3)(R_4)—C(R_5)(H)—C(O)—$, and (iii) $—C(R_3)(R_4)—C(R_5)(H)—S(O)(O)$; and (A) is bonded to the $—C(R_3)(R_4)—$ group of (C), and (B) is bonded to (C).

23 Claims, No Drawings

AMPHOTERIC POLYMERS AND USE IN INKJET INK COMPOSITIONS

FIELD OF THE INVENTION

Disclosed herein are amphoteric polymers capable of binding calcium as well as dispersions and inkjet ink compositions comprising such polymers.

BACKGROUND

There is continuous development in improving image quality from inkjet printing, as measured by properties such as optical density and mottle. For inks based on aqueous pigment dispersions, optical density can be affected by the rate of pigment aggregation on the substrate. Slow pigment aggregation can lead to poor or average image quality. It has been previously discovered that aggregation can be increased by using pigments capable of binding calcium. Because many papers contain solutes such as $Ca^{2+}$, $Mg^{2+}$ and $Na^+$ salts on the surface, the calcium binding pigments can affix to the paper via the salts and enhance the rate of aggregation. For plain and coated papers containing low concentrations of such salts, however, the advantages afforded by calcium binding pigments is lessened.

Accordingly, there remains a need to develop inkjet ink compositions having improved printing performance on a variety of substrates.

SUMMARY

One embodiment provides a polymer comprising the repeat units (A), (B), and (C), wherein:
 (A) is selected from —N($R_1$)— and —N$^+$($R_1$)($R_2$)—;
 (B) is selected from $C_1$-$C_{10}$ alkylene; $C_3$-$C_{20}$ cycloalkylene; $C_3$-$C_{20}$ heterocycloalkylene; arylene; heteroarylene; $C_2$-$C_{20}$ ether; $C_2$-$C_{20}$ thioether; $C_2$-$C_{20}$ ester; $C_2$-$C_{20}$ acetal; $C_2$-$C_{20}$ amide; bisphenols; and oligomer and polymer moieties selected from polyether, polyester, polyamines, polycarbonate, polyacetal, polythioether, polyester amide, polyurethane, polyacrylate, polyolefin, and polyalkylsiloxane,
 (C) comprises at least one group selected from:
  (i) —C($R_3$)($R_4$)—C($R_5$)(OH)—(C($R_6$)($R_7$))$_m$—,
  (ii) —C($R_3$)($R_4$)—C($R_5$)(H)—C(O)—, and
  (iii) —C($R_3$)($R_4$)—C($R_5$)(H)—S(O)(O)—; and
 (A) is bonded to the —C($R_3$)($R_4$)— group of (C),
 (B) is bonded to (C),
 $R_1$ is selected from $C_1$-$C_{10}$ alkyl, $C_4$-$C_{18}$ aryl, $C_4$-$C_{18}$ heteroaryl, and $C_3$-$C_{20}$ heterocycloalkyl, each being substituted with at least one functional group; $R_2$ is selected from H, $C_1$-$C_{10}$ alkyl, $C_4$-$C_{18}$ aryl, $C_1$-$C_{10}$ alkyl substituted with at least one functional group, and $C_4$-$C_{18}$ aryl substituted with at least one functional group, wherein $R_1$, or $R_1$ and $R_2$ together, has a calcium index value greater than or equal to a calcium index value of phenylphosphonic acid,
 m is an integer ranging from 0-10, and
 $R_3$-$R_7$ are each independently selected from H; $C_1$-$C_{10}$ alkyl; and $C_4$-$C_{18}$ aryl.

Other embodiments provide dispersions and inkjet ink compositions comprising the polymers disclosed herein. The inkjet ink compositions can comprise at least one pigment (unmodified or self-dispersed) and a liquid vehicle, e.g., an aqueous liquid vehicle. The composition can comprise the polymer as a crosslinked polymer. The polymer can be a dispersant. In one embodiment, the polymer is a first polymer and the composition comprises a second polymer that is a polymeric dispersant.

Another embodiment provides a modified pigment comprising a pigment having attached a polymer comprising the repeat units (A), (B), and (C), wherein:
 (A) is selected from —N($R_1$)— and —N$^+$($R_1$)($R_2$)—;
 (B) is selected from $C_1$-$C_{10}$ alkylene; $C_3$-$C_{20}$ cycloalkylene; $C_3$-$C_{20}$ heterocycloalkylene; arylene; heteroarylene; $C_2$-$C_{20}$ ether; $C_2$-$C_{20}$ thioether; $C_2$-$C_{20}$ ester; $C_2$-$C_{20}$ acetal; $C_2$-$C_{20}$ amide; bisphenols; and oligomer and polymer moieties selected from polyether, polyester, polyamines, polycarbonate, polyacetal, polythioether, polyester amide, polyurethane, polyacrylate, polyolefin, and polyalkylsiloxane,
 (C) comprises at least one group selected from:
  (i) —C($R_3$)($R_4$)—C($R_5$)(OH)—(C($R_6$)($R_7$))$_m$—,
  (ii) —C($R_3$)($R_4$)—C($R_5$)(H)—C(O)—, and
  (iii) —C($R_3$)($R_4$)—C($R_5$)(H)—S(O)(O)—; and
 (A) is bonded to the —C($R_3$)($R_4$)— group of (C),
 (B) is bonded to (C),
 $R_1$ is selected from $C_1$-$C_{10}$ alkyl, $C_4$-$C_{18}$ aryl, $C_4$-$C_{18}$ heteroaryl, and $C_3$-$C_{20}$ heterocycloalkyl, each being substituted with at least one functional group; $R_2$ is selected from H, $C_1$-$C_{10}$ alkyl, $C_4$-$C_{18}$ aryl, $C_1$-$C_{10}$ alkyl substituted with at least one functional group, and $C_4$-$C_{18}$ aryl substituted with at least one functional group, wherein $R_1$, or $R_1$ and $R_2$ together, has a calcium index value greater than or equal to a calcium index value of phenylphosphonic acid,
 m is an integer ranging from 0-10, and
 $R_3$-$R_7$ are each independently selected from H; $C_1$-$C_{10}$ alkyl; and $C_4$-$C_{18}$ aryl.

Another embodiment provides a method of making a polymer comprising the repeat units (A) and (B), the method comprising:
 reacting at least one monomer having the structure H-A-H with at least one second monomer comprising (B) bonded to at least one group selected from glycidyl ethers, α,β-unsaturated carbonyls, and α,β-unsaturated sulfonyls,
 wherein (A) is selected from —N($R_1$)— and —N$^+$($R_1$)($R_2$)—, $R_1$ is selected from $C_1$-$C_{10}$ alkyl, $C_4$-$C_{18}$ aryl, $C_4$-$C_{18}$ heteroaryl, and $C_3$-$C_{20}$ heterocycloalkyl, each being substituted with at least one functional group; $R_2$ is selected from $C_1$-$C_{10}$ alkyl, $C_4$-$C_{18}$ aryl, $C_1$-$C_{10}$ alkyl substituted with at least one functional group, and $C_4$-$C_{18}$ aryl substituted with at least one functional group, wherein $R_1$, or $R_1$ and $R_2$ together, has a calcium index value greater than or equal to a calcium index value of phenylphosphonic acid, and
 wherein (B) is selected from $C_1$-$C_{10}$ alkylene; $C_3$-$C_{20}$ cycloalkylene; $C_3$-$C_{20}$ heterocycloalkylene; arylene; heteroarylene; $C_2$-$C_{20}$ ether; $C_2$-$C_{20}$ ester; $C_2$-$C_{20}$ acetal; $C_2$-$C_{20}$ amide; bisphenols; and oligomer and polymer moieties selected from polyether, polyester, polyamines, polycarbonate, polyacetal, polythioether, polyester amide, polyurethane, polyolefin, and polyalkylsiloxane.

DETAILED DESCRIPTION

Disclosed herein are amphoteric polymers capable of binding calcium. Due to the amphoteric nature of the polymer (i.e., contains both cationic and anionic groups), control of the type of calcium binding groups, the pH, and the concentration of free ions, etc., can allow the overall polymer to vary from negative to positive, or to a neutral charge. When pigment-based inks containing such polymers are deposited on the substrate, the original cationic/anionic charge balance can further change due to the ionic components present in the substrate. The change in overall charge of the polymers can affect the stability of the pigment dispersions, leading to pigment agglomeration on the substrate, which can in turn increase optical density, mottle and/or durability.

One embodiment provides a polymer comprising the repeat units (A), (B), and (C), wherein:

(A) is selected from —$N^+(R_1)(R_2)$— and —$N(R_1)$—;

(B) is selected from $C_1$-$C_{10}$ alkylene; $C_3$-$C_{20}$ cycloalkylene; $C_3$-$C_{20}$ heterocycloalkylene; arylene; heteroarylene; $C_2$-$C_{20}$ ether; $C_2$-$C_{20}$ thioether; $C_2$-$C_{20}$ ester; $C_2$-$C_{20}$ acetal; $C_2$-$C_{20}$ amide; bisphenols; and oligomer and polymer moieties selected from polyether, polyester, polyamines, polycarbonate, polyacetal, polythioether, polyester amide, polyurethane, polyacrylate, polyolefin, and polyalkylsiloxane;

(C) comprises at least one group selected from:
(i) —$C(R_3)(R_4)$—$C(R_5)(OH)$—$(C(R_6)(R_7))_m$—,
(ii) —$C(R_3)(R_4)$—$C(R_5)(H)$—$C(O)$—, and
(iii) —$C(R_3)(R_4)$—$C(R_5)(H)$—$S(O)(O)$—; and (A) is bonded to the —$C(R_3)(R_4)$— group of (C), (B) is bonded to (C), $R_1$ is selected from $C_1$-$C_{10}$ alkyl, $C_4$-$C_{18}$ aryl, $C_4$-$C_{18}$ heteroaryl, and $C_3$-$C_{20}$ heterocycloalkyl, each being substituted with at least one functional group; $R_2$ is selected from H, $C_1$-$C_{10}$ alkyl, $C_4$-$C_{18}$ aryl, $C_1$-$C_{10}$ alkyl substituted with at least one functional group, and $C_4$-$C_{18}$ aryl substituted with at least one functional group, wherein $R_1$, or $R_1$ and $R_2$ together, has a calcium index value greater than or equal to a calcium index value of phenylphosphonic acid, m is an integer ranging from 0-10, and $R_3$-$R_7$ are each independently selected from H; $C_1$-$C_{10}$ alkyl; and $C_4$-$C_{18}$ aryl.

In another embodiment, the polymer consists essentially of, or consists of repeat units (A), (B), and (C). Other larger repeat units comprising two or more of (A), (B), and (C) can also be generated.

In one embodiment, with regard to any repeat unit disclose herein, the polymer is a random copolymer.

In one embodiment, "alkyl" refers to a straight or branched hydrocarbon chain, e.g., a $C_1$-$C_{10}$ alkyl refers to a straight or branched hydrocarbon chain of 1-10 carbon atoms. In one embodiment, the alkyl is selected from a $C_1$-$C_6$ alkyl, or a $C_1$-$C_4$ alkyl. In one embodiment, "aryl" refers to a mono-, bi-, or other multi-carbocyclic, aromatic ring, e.g., a $C_4$-$C_{18}$ aryl, a $C_4$-$C_{12}$ aryl, a $C_4$-$C_8$ aryl or a $C_4$-$C_6$ aryl. In one embodiment, "cycloalkyl" refers to a monovalent saturated or unsaturated cyclic hydrocarbon group of 3-8 carbon atoms, e.g., a $C_3$-$C_8$ or $C_3$-$C_6$ cycloalkyl. In one embodiment, "heterocycloalkyl" refers to a cycloalkyl having one or more heteroatoms (e.g., O, N, and/or S) as a ring atom. In one embodiment, "heteroaryl" refers to an aryl having one or more heteroatoms (e.g., O, N, and/or S) as a ring atom.

In one embodiment, the polymer comprises repeat unit (A) selected from —$N(R_1)$—. Optionally, a portion or all of the (A) repeat units can subsequently be converted to —$N^+(R_1)(R_2)$—, such as by protonation, alkylation, or arylation, e.g., $R_2$ is selected from H, $C_1$-$C_{10}$ alkyl, and $C_4$-$C_{18}$ aryl. In one embodiment, the polymer contains both —$N^+(R_1)(R_2)$— and —$N(R_1)$— as (A) repeat units.

In one embodiment, the overall charge of the polymer is affected by pH. For example, for the repeat unit (A), which can be —$N^+(R_1)(R_2)$— and/or —$N(R_1)$—, a low pH will favor a greater number of positively charged —$N^+(R_1)(R_2)$— repeat units if $R_2$ is H. Moreover, if the functional group is an acid, a high pH will favor the anionic salt form.

One embodiment provides a dispersion (e.g., an aqueous dispersion), such as an inkjet ink composition having a pH ranging from 3 to 12, e.g., from 3 to 11, from 3 to 10, from 3 to 9.5, from 3 to 9, from 4 to 12, from 4 to 11, from 4 to 10, from 4 to 9.5, from 4 to 9, from 5 to 12, from 5 to 11, from 5 to 10, from 5 to 9.5, from 5 to 9, from 6 to 12, from 6 to 11, from 6 to 10, from 6 to 9.5, from 6 to 9, from 7 to 12, from 7 to 11, from 7 to 10, from 7 to 9.5, or from 7 to 9. In one embodiment, both —$N^+(R_1)(R_2)$— and —$N(R_1)$— groups are present as (A) repeat units where $R_2$ is H and the ratio of —$N^+(R_1)(R_2)$— to —$N(R_1)$— groups varies depending on the pH. In one embodiment, the pH ranges from 7 to 10, e.g., from 7 to 9.5.

Additives for controlling or regulating the pH of the inkjet ink composition of the present invention may also be used. Examples of suitable pH regulators include various amines such as diethanolamine and triethanolamine as well as various hydroxide reagents. A hydroxide reagent is any reagent that comprises an $OH^-$ ion, such as a salt having a hydroxide counterion. Examples include sodium hydroxide, potassium hydroxide, lithium hydroxide, ammonium hydroxide, and tetramethyl ammonium hydroxide. Other hydroxide salts, as well as mixtures of hydroxide reagents, can also be used. Furthermore, other alkaline reagents may also be used which generate $OH^-$ ions in an aqueous medium. Examples include carbonates such as sodium carbonate, bicarbonates such as sodium bicarbonate, and alkoxides such as sodium methoxide and sodium ethoxide. Buffers may also be added.

In one embodiment, (B) is selected from:
- $C_1$-$C_{10}$ alkylene, e.g., a bridging alkyl group such as $C_1$-$C_6$ alkylene or $C_1$-$C_4$ alkylene, e.g., ethylene or propylene;
- $C_3$-$C_{20}$ cycloalkylene, e.g., a bridging cycloalkyl group that can be a cyclic, bicyclic, or other multicyclic alkylene, e.g., a $C_3$-$C_{12}$ cycloalkylene, a $C_3$-$C_8$ cycloalkylene (e.g., a 1,4-cyclohexanedimethyl), or a $C_3$-$C_6$ cycloalkylene;
- $C_3$-$C_{20}$ heterocycloalkylene, e.g., a cycloalkylene having one or more heteroatoms (e.g., O, N, and/or S) as a ring atom, e.g., a $C_3$-$C_{12}$ heterocycloalkylene, a $C_3$-$C_8$ heterocycloalkylene, or a $C_3$-$C_6$ heterocycloalkylene;
- arylene, e.g., a bridging aryl group (e.g., a $C_4$-$C_{18}$ arylene) via 1,2-, 1,3-, or 1,4-carbon atoms;
- heteroarylene, e.g., an arylene having one or more heteroatoms (e.g., O, N, and/or S) as a ring atom;
- $C_2$-$C_{20}$ ether, e.g., —($C_{2-20}$ alkyl)-O—, —O—($C_{2-20}$ alkyl)-O—, —($C_{2-20}$ alkyl)-O—($C_{2-20}$ alkyl)-, —($C_{4-18}$ aryl)-O—, —O—($C_{4-18}$ aryl)-O—, —($C_{4-18}$ aryl)-O—($C_{4-18}$ aryl)-, —($C_{2-20}$ alkyl)-O—($C_{4-18}$ aryl);
- $C_2$-$C_{20}$ thioether, e.g., —($C_{2-20}$ alkyl)-S—, —S—($C_{2-20}$ alkyl)-S—, —($C_{2-20}$ alkyl)-S—($C_{2-20}$ alkyl)-, —($C_{4-18}$ aryl)-S—, —S—($C_{4-18}$ aryl)-S—, —($C_{4-18}$ aryl)-S—($C_{4-18}$ aryl)-, —($C_{2-20}$ alkyl)-S—($C_{4-18}$ aryl);
- $C_2$-$C_{20}$ ester, e.g., —($C_{2-20}$ alkyl or cycloalkyl)-C(O)O—, —OC(O)—($C_{2-20}$ alkyl or cycloalkyl)-C(O)O—, —($C_{2-20}$ alkyl or cycloalkyl)-C(O)O—($C_{2-20}$ alkyl or cycloalkyl)-, —($C_{4-18}$ aryl)-C(O)O—, —OC(O)—($C_{4-18}$ aryl)-C(O)O—, —($C_{4-18}$ aryl)-C(O)O—($C_{2-20}$ alkyl or cycloalkyl)-;
- $C_2$-$C_{20}$ acetal, e.g., —($C_2$-$C_{20}$ alkyl or cycloalkyl)-C(OR$^a$)(OR$^b$)—, —($C_4$-$C_{18}$ aryl)-C(OR$^a$)(OR$^b$)—, where $R^a$ and $R^b$ are independently selected from H and $C_1$-$C_{10}$ alkyl;
- $C_2$-$C_{20}$ amide, e.g., —($C_2$-$C_{20}$ alkyl)-C(O)NR$^a$—, —($C_4$-$C_{18}$ aryl)-C(O)NR$^a$—, where $R^a$ is selected from H and $C_1$-$C_{10}$ alkyl; and
- bisphenols, e.g., containing two hydroxyphenyl groups, such as bisphenol A, bisphenol F, phenol novolacs, and bishydantoin.

Mixtures of (B) repeat units can also be used to form the (B) repeat unit. For example, a (B) repeat unit can include an ether bonded to a polyether linked by an arylene or $C_1$-$C_{10}$ alkylene, polyethers bonded to a polythioether linked by an arylene or $C_1$-$C_{10}$ alkylene, or $C_1$-$C_{10}$ alkylenes bonded to bisphenols (e.g., bisphenol A) via an ether linkage.

In one embodiment (B) is selected from oligomer and polymer moieties selected from polyether, polyester, polyamines, polycarbonate, polyacetal, polythioether, polyester amide, polyurethane, polyacrylate, polyolefin, and polyalkylsiloxane. In one embodiment, an oligomer or polymer moiety comprises at least 2 repeat units (i.e., derived from two moles of monomer), e.g., ranging from 2 to 100 repeat units, from 2 to 75 repeat units, from 2 to 50 repeat units, from 3 to 100 repeat units, from 3 to 75 repeat units, from 3 to 50 repeat units, from 5 to 100 repeat units, from 5 to 75 repeat units, or from 5 to 50 repeat units. In one embodiment, the molecular weight ($M_n$) of the oligomer or polymer moiety ranges from 200 to 5000, e.g., from 200 to 3000, 200 to 2000, 200 to 1000, from 300 to 5000, from 300 to 3000, from 300 to 2000, from 300 to 1000, from 500 to 5000, from 500 to 3000, from 500 to 2000, or from 500 to 1000.

In one embodiment, (B) is selected from $C_1$-$C_{10}$ alkylene; arylene; $C_2$-$C_{20}$ ether; $C_2$-$C_{20}$ thioether; $C_2$-$C_{20}$ ester; $C_2$-$C_{20}$ acetal; $C_2$-$C_{20}$ amide; bisphenols; and oligomer and polymer moieties selected from polyether, polyester, polyamines, polythioether, polyurethane, polyalkylsiloxane, and polyolefin. In one embodiment, (B) is selected from $C_1$-$C_{10}$ alkylene; $C_2$-$C_{20}$ ether; $C_2$-$C_{20}$ thioether; bisphenols; and oligomer and polymer moieties selected from polyether, polyamines, polythioether, polyurethane, polyalkylsiloxane, and polyolefin. In one embodiment, (B) is selected from polyethers, polythioethers, and bisphenols, e.g., selected from polyethers and bisphenols.

In one embodiment, (B) is a polyether. Polyethers can be aliphatic, aromatic, or mixtures thereof. In one embodiment, the polyether is selected from polyalkylene oxide, where the alkylene can be a straight or branched hydrocarbon chain, e.g., $C_1$-$C_6$ or $C_1$-$C_3$ alkylene oxide, such as ethylene or propylene oxide.

In one embodiment, (B) is a polyester. Polyesters can be aliphatic, aromatic, or mixtures thereof. In one embodiment, the polyester is derived from the polycondensation reactions between dicarboxylic acids (or derivatives such as esters or anhydrides) and diols (or polyols), where dicarboxylic acids can be adipic acid, glutaric acid, succinic acid, phthalic anhydride, and terephthalic acid, and diols can be ethylene glycol, diethylene glycol, 1,2-propylene glycol, 1,4-butanediol, neopentyl glycol, and 1,6-xexanediol.

In one embodiment, (B) is a polyurethane. Polyurethane can be aliphatic, aromatic, or mixtures thereof. In one embodiment, this polyurethane is derived from the reaction of diisocyanates and polyols, where diisocyanates can be toluene diisocyanate, hexamethylene diisocyanate, methylene diphenyl diisocyanate, m-tetramethylxylene diisocyanate, and isophorone diisocyanate, and polyols can be $C_1$-$C_{10}$ alkylene, $C_3$-$C_{20}$ cycloalkylene, $C_3$-$C_{20}$ heterocycloalkylene, arylene, heteroarylene, a polypropylene glycol moiety, and a polytetramethyleneoxide moiety.

In one embodiment, (B) is a polythioether. Polythioether can be aliphatic, aromatic, or mixtures thereof.

In one embodiment, (B) is a polyalkylsiloxane. Polyalkylsiloxanes can be linear or branched. In one embodiment, the polyalkylsiloxane is derived from the reaction of dialkyldichlorosilane and water, where alkyl is defined herein, e.g., methyl.

In one embodiment, repeat unit (A) is bonded to the —C($R_3$)($R_4$)— group of (C). In one embodiment, repeat unit (B) can also be bonded to (C), but not through the —C($R_3$)($R_4$)— group. In one embodiment, the polymer comprises the repeat unit A-C-B-C.

In one embodiment, (C) comprises at least one group selected from:

(i) —C($R_3$)($R_4$)—C($R_5$)(OH)—(C($R_6$)($R_7$))$_m$—,
(ii) —C($R_3$)($R_4$)—C($R_5$)(H)—C(O)—, and
(iii) —C($R_3$)($R_4$)—C($R_5$)(H)—S(O)(O)—; and (C) can also comprise other groups so long as at least one group (i), (ii), and (iii) is present.

In one embodiment, $R_3$-$R_7$ are each independently selected from H; $C_1$-$C_{10}$ alkyl; and $C_4$-$C_{18}$ aryl. In another embodiment, $R_3$-$R_7$ are each independently selected from H and $C_1$-$C_{10}$ alkyl.

In one embodiment, repeat unit (C) is selected from (i) in which m is an integer ranging from 0 to 10. In one embodiment, repeat unit (C)(i) above can be derived from diglycidyl ethers of repeat unit (B). In one embodiment, (C)(i) is derived from an epoxide group having the structure:

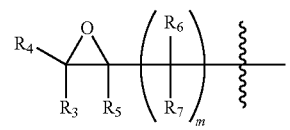

Reaction of the epoxide with a primary amine, as the source of repeat unit (A), can yield (C)(i) bonded to (A) as an intermediate:

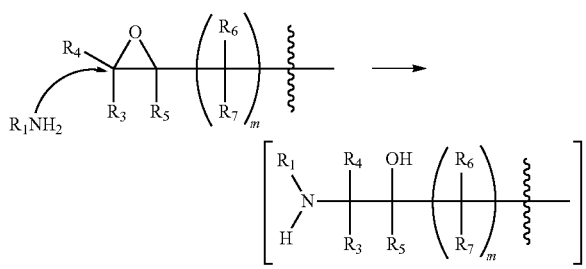

Repeat unit (A) can be derived from primary amines (e.g., $AH_2$) having sufficient nucleophilicity to react with glycidyl ethers or unsaturated species such as α,β-unsaturated carbonyl derivatives and α,β-unsaturated sulfonyl derivatives.

In one embodiment, repeat unit (C) is selected from (ii) in which m is an integer ranging from 0 to 10. In one embodiment, (C)(ii) is derived from α,β-unsaturated carbonyl derivatives of repeat unit (B). In one embodiment, (C)(ii) is derived from an olefin having the structure:

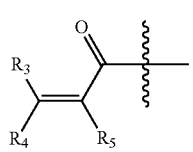

Reaction of the olefin with a primary amine, as the source of repeat unit (A), can yield (ii) bonded to (A) as an intermediate:

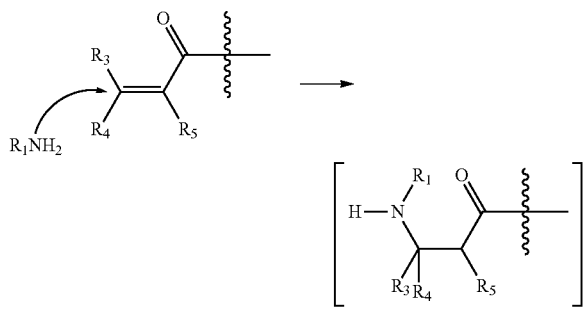

In one embodiment, repeat unit (C) is selected from (iii) in which m is an integer ranging from 0 to 10. In one embodiment, (C)(iii) is derived from α,β-unsaturated sulfonyl derivatives of repeat unit (B). In one embodiment, (C)(iii) is derived from an olefin group having the structure:

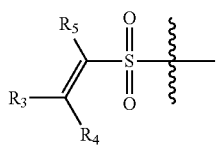

Reaction of the olefin with a primary amine, as the source of repeat unit (A), can yield (iii) bonded to (A) as an intermediate:

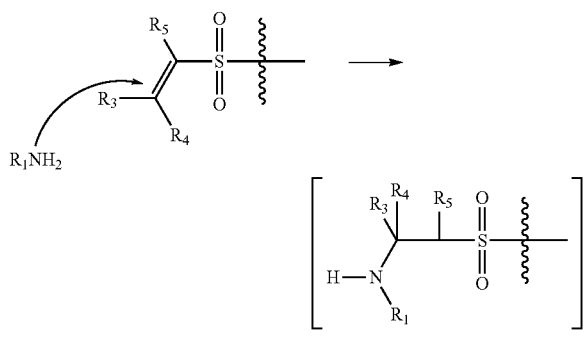

Any of the secondary amines in the intermediates above can react with another epoxide or olefin to form a repeat unit (A) having a tertiary amine, e.g., the structure —N($R_1$)—. This amine can be further reacted with an $R_2$-containing group to form a repeat unit (A) having the structure —N$^+$($R_1$)($R_2$)—. This further reaction can take the form of protonation, alkylation, arylation, etc., in which $R_2$ is selected from H, $C_1$-$C_{10}$ alkyl, and $C_4$-$C_{18}$ aryl.

In one embodiment, (B) is bonded to (C) via the —C($R_5$)(OH)— or —C($R_6$)($R_7$)$_m$— (where m=1-10) group of (C) in the case of structure (i), or (B) is bonded to (C) via the —C(O)— group of (C) in the case of structure (ii), or (B) is bonded to (C) via the —S(O)(O)— group of (C) in the case of structure (iii).

In one embodiment, (B) is bonded to one or both (C) groups via linker group X, wherein X is selected from O, N($R_8$), C($R_9$)($R_{10}$), and O—C($R_9$)($R_{10}$), where $R_8$-$R_{10}$ are each independently selected from H; $C_1$-$C_{10}$ alkyl; and $C_4$-$C_{18}$ aryl, e.g., from H and $C_1$-$C_{10}$ alkyl. Thus, one or two linker groups X may be present. In one embodiment where linker groups are used to bond (B) to (C), the polymer can comprise any of the repeat units:

C-B-X-C, C-X-B-C, and C-X-B-X-C.

Taking into account the (A) repeat unit, in one embodiment, the polymer comprises any of the repeat units:

A-C-B-X-C, A-C-X-B-C, and A-C-X-B-X-C.

In one embodiment, the X groups used to bind the (C) repeat units can be the same or different and are denoted, $X_1$ and $X_2$, such that the polymer comprises a repeat unit selected from:

C-$X_1$-B-$X_2$-C wherein $X_1$ and $X_2$ are independently selected from O, N($R_8$), C($R_9$)($R_{10}$), and O—C($R_9$)($R_{10}$), i.e., $X_1$ and $X_2$ can be the same or different. For example, different X groups can be used to bind asymmetric (B) repeat units, such as oligomer or polymer moieties in which the repeat units differ on either end. For example, where (B) is a polyether having the repeat unit -[alkylene-O]—, $X_1$ can be an oxygen atom that binds to the alkylene of the polyether repeat unit and $X_2$ can be an alkyl or aryl that binds to the oxygen atom of the polyether repeat unit. Taking into account the (A) repeat unit, in one embodiment, the polymer comprises the repeat unit

A-C-$X_1$-B-$X_2$-C.

In one embodiment, the (C) repeat unit comprises repeat units $C_1$ and $C_2$ (two different repeat units). Varying repeat units can result, e.g., $C_1$-B-$C_2$ and variants thereof, e.g., $C_1$-X-B-$C_2$, $C_1$B-X-$C_2$, $C_1$-$X_1$-B-$X_2$-$C_2$. It is understood that repeat units (A) and (B) can also vary among each variant. Examples of such repeat units include:

—C($R_3$)($R_4$)—C($R_5$)(OH)—(C($R_6$)($R_7$))$_m$-$X_1$-B-$X_2$-(C($R_{11}$)($R_{12}$))$_m$—C($R_{13}$)(OH)—C($R_{14}$)($R_{15}$)—,

—C($R_3$)($R_4$)—C($R_5$)(H)—C(O)-$X_1$-B-$X_2$-C(O)—C($R_{11}$)(H)—C($R_{12}$)($R_{13}$)—,

—C($R_3$)($R_4$)—C($R_5$)(H)—S(O)(O)-$X_1$-B-$X_2$-S(O)(O)—C($R_{11}$)(H)—C($R_{12}$)($R_{13}$)—,

—C($R_3$)($R_4$)—C($R_5$)(OH)—(C($R_6$)($R_7$))$_m$-$X_1$-B-$X_2$-C(O)—C($R_{11}$)(H)—C($R_{12}$)($R_{13}$), and —C($R_3$)($R_4$)—C($R_5$)(OH)—(C($R_6$)($R_7$))$_m$-$X_1$-B-$X_2$-S(O)(O)—C($R_{11}$)(H)—C($R_{12}$)($R_{13}$)— wherein $R_{11}$-$R_{15}$ are each independently selected from H; $C_1$-$C_{10}$ alkyl; and $C_4$-$C_{18}$ aryl, e.g., independently selected from H and $C_1$-$C_{10}$ alkyl.

In one embodiment, the polymer comprises at least one repeat unit selected from:

—C($R_3$)($R_4$)—C($R_5$)(OH)—(C($R_6$)($R_7$))$_m$-B-X-(C($R_{11}$)($R_{12}$))$_m$—C($R_{13}$)(OH)—C($R_{14}$)($R_{15}$)—,

—C($R_3$)($R_4$)—C($R_5$)(OH)—(C($R_6$)($R_7$))$_m$-X-B-(C($R_{11}$)($R_{12}$))$_m$—C($R_{13}$)(OH)—C($R_{14}$)($R_{15}$)—,

—C($R_3$)($R_4$)—C($R_5$)(OH)—(C($R_6$)($R_7$))$_m$-$X_1$-B-$X_2$-(C($R_{11}$)($R_{12}$))$_m$—C($R_{13}$)(OH)—C($R_{14}$)($R_{15}$)—.

—C($R_3$)($R_4$)—C($R_5$)(H)—C(O)-B-X-C(O)—C($R_{11}$)(H)—C($R_{12}$)($R_{13}$)—,

—C($R_3$)($R_4$)—C($R_5$)(H)—C(O)-X-B-C(O)—C($R_{11}$)(H)—C($R_{12}$)($R_{13}$)—,

—C($R_3$)($R_4$)—C($R_5$)(H)—C(O)-$X_1$-B-$X_2$-C(O)—C($R_{11}$)(H)—C($R_{12}$)($R_{13}$)—,

—C($R_3$)($R_4$)—C($R_5$)(H)—S(O)(O)-B-X-S(O)(O)—C($R_{11}$)(H)—C($R_{12}$)($R_{13}$)—,

—C(R$_3$)(R$_4$)—C(R$_5$)(H)—S(O)(O)-X-B-S(O)(O)—C(R$_{11}$)(H)—C(R$_{12}$)(R$_{13}$)—,

—C(R$_3$)(R$_4$)—C(R$_5$)(H)—S(O)(O)-X$_1$-B-X$_2$-S(O)(O)—C(R$_{11}$)(H)—C(R$_{12}$)(R$_{13}$)—,

—C(R$_3$)(R$_4$)—C(R$_5$)(OH)—(C(R$_6$)(R$_7$))$_m$-B-X-C(O)—C(R$_{11}$)(H)—C(R$_{12}$)(R$_{13}$)—,

—C(R$_3$)(R$_4$)—C(R$_5$)(OH)—(C(R$_6$)(R$_7$))$_m$-X-B-C(O)—C(R$_{11}$)(H)—C(R$_{12}$)(R$_{13}$)—,

—C(R$_3$)(R$_4$)—C(R$_5$)(OH)—(C(R$_6$)(R$_7$))$_m$-X$_1$-B-X$_2$-C(O)—C(R$_{11}$)(H)—C(R$_{12}$)(R$_{13}$)—,

—C(R$_3$)(R$_4$)—C(R$_5$)(OH)—(C(R$_6$)(R$_7$))$_m$-B-X-S(O)(O)—C(R$_{11}$)(H)—C(R$_{12}$)(R$_{13}$)—,

—C(R$_3$)(R$_4$)—C(R$_5$)(OH)—(C(R$_6$)(R$_7$))$_m$-X-B-S(O)(O)—C(R$_{11}$)(H)—C(R$_{12}$)(R$_{13}$)—, and —C(R$_3$)(R$_4$)—C(R$_5$)(OH)—(C(R$_6$)(R$_7$))$_m$-X$_1$-B-X$_2$-S(O)(O)—C(R$_{11}$)(H)—C(R$_{12}$)(R$_{13}$)—, wherein R$_{11}$-R$_{15}$ are each independently selected from H; C$_1$-C$_{10}$ alkyl; and C$_4$-C$_{18}$ aryl.

Other examples of C-B-C repeat units (and variants thereof) include:

[—C(R$_3$)(R$_4$)—C(R$_5$)(OH)—(C(R$_6$)(R$_7$))$_m$-X$_1$]$_2$-B,

[—C(R$_3$)(R$_4$)—C(R$_5$)(H)—C(O)-X$_1$]$_2$-B,

[—C(R$_3$)(R$_4$)—C(R$_5$)(H)—S(O)(O)-X$_1$]$_2$-B,

—C(R$_3$)(R$_4$)—C(R$_5$)(OH)—(C(R$_6$)(R$_7$))$_m$-X$_1$-B-X$_2$-C(O)—C(R$_{11}$)(H)—C(R$_{12}$)(R$_{13}$)—, and —C(R$_3$)(R$_4$)—C(R$_5$)(OH)—(C(R$_6$)(R$_7$))$_m$-X$_1$-B-X$_2$-S(O)(O)—C(R$_{11}$)(H)—C(R$_{12}$)(R$_{13}$)—, wherein R$_{11}$-R$_{15}$ are each independently selected from H; C$_1$-C$_{10}$ alkyl; and C$_4$-C$_{18}$ aryl.

In one embodiment, the polymer comprises at least one repeat unit selected from:

—C(R$_3$)(R$_4$)—C(R$_5$)(OH)—(C(R$_6$)(R$_7$))$_m$-B-X-(C(R$_6$)(R$_7$))$_m$—C(R$_5$)(OH)—C(R$_3$)(R$_4$)—,

—C(R$_3$)(R$_4$)—C(R$_5$)(OH)—(C(R$_6$)(R$_7$))$_m$-X-B-(C(R$_6$)(R$_7$))$_m$—C(R$_5$)(OH)—C(R$_3$)(R$_4$)—,

—C(R$_3$)(R$_4$)—C(R$_5$)(OH)—(C(R$_6$)(R$_7$))$_m$-X$_1$-B-X$_2$-(C(R$_6$)(R$_7$))$_m$—C(R$_5$)(OH)—C(R$_3$)(R$_4$)—,

—C(R$_3$)(R$_4$)—C(R$_5$)(H)—C(O)-B-X-C(O)—C(R$_5$)(H)—C(R$_3$)(R$_4$),

—C(R$_3$)(R$_4$)—C(R$_5$)(H)—C(O)-X-B-C(O)—C(R$_5$)(H)—C(R$_3$)(R$_4$),

—C(R$_3$)(R$_4$)—C(R$_5$)(H)—C(O)-X$_1$-B-X$_2$-C(O)—C(R$_5$)(H)—C(R$_3$)(R$_4$),

—C(R$_3$)(R$_4$)—C(R$_5$)(H)—S(O)(O)-B-X-S(O)(O)—C(R$_5$)(H)—C(R$_3$)(R$_4$),

—C(R$_3$)(R$_4$)—C(R$_5$)(H)—S(O)(O)-X-B-S(O)(O)—C(R$_5$)(H)—C(R$_3$)(R$_4$), and —C(R$_3$)(R$_4$)—C(R$_5$)(H)—S(O)(O)-X$_1$-B-X$_2$-S(O)(O)—C(R$_5$)(H)—C(R$_3$)(R$_4$)

In one embodiment, the repeat unit C-B-C (and variants thereof, e.g., C-B-X-C, C-X-B-C, C-X$_1$-B-X$_2$-C, C$_1$-B-C$_2$, C$_1$-X-B-C$_2$, C$_1$B-X-C$_2$, C$_1$-X$_1$B-X$_2$-C$_2$) is derived from a single reagent. For example, repeat unit (C)(i) above can be derived from diglycidyl ethers of repeat unit (B), such as bisphenol A diglycidyl ether (BPA-DGE) or polypropylene glycol diglycidyl ether (PPG-DGE), where (B) is bisphenol A and polypropylene glycol, respectively. Other examples include diol diglycidyl ethers such as 1,4-butanediol diglycidyl ether (B is a C$_4$ ether), 1,4-cyclohexanedimethanol diglycidyl ether (B is a C$_8$ cycloalkylene), 1,2,7,8-diepoxyoctane (B is a C$_4$ alkyl), diglycidyl 1,2-cyclohexanedicarboxylate (B is a C$_6$ cycloalkyl diester), neopentyl glycol diglycidyl ether (B is a C$_5$ ether), resorcinol diglycidyl ether (B is a C$_6$ aryl), bisphenol F diglycidyl ether (B is bisphenol F), Bisphenol A propoxylate diglycidyl ether (B is propoxylated bisphenol A), 1,2,5,6-diepoxycyclooctane (B is cycloalkylene), and 3,4-epoxycyclohexylmethyl 3,4-epoxycyclohexanecarboxylate (B is C$_2$-C$_{20}$ ester).

In one embodiment, diglycidyl ethers can be prepared by reacting epichlorohydrin (1-chloro-2,3-epoxypropane) with a variety of reagents, such as diols (e.g., bisphenol A, PEG, PPG). Other epoxide-forming reactions known in the art can also be used, such as oxidation of olefins.

The resulting polymer can have a repeat unit A-C-B-C, variants of which include:

A-C-B-X-C,

A-C-X-B-C,

A-C-X$_1$-B-X$_2$C,

A-C$_1$-B-C$_2$,

A-C$_1$-X-B-C$_2$,

A-C$_1$-B-X-C$_2$, and

A-C$_1$-X$_1$-B-X$_2$-C$_2$.

In one embodiment, the repeat unit A-C-B-C (and variants thereof) can be derived from α,β-unsaturated carbonyl derivatives of repeat unit (B) or from α,β-unsaturated sulfonyl derivatives of repeat unit (B), e.g., α,β-unsaturated carbonyl derivatives of polyethers or bisphenol A. Examples of such repeat units include:

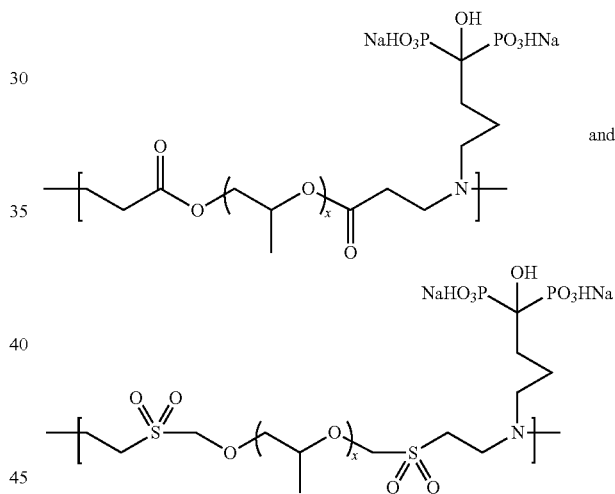

where x ranges from 2 to 100, or other ranges of (B) repeat units as disclosed herein.

Examples of repeat unit A-C-B-C (and variants thereof, as disclosed herein) include those obtained from a derivative of (B) (e.g., polyether) comprising glycidyl ether and a α,β-unsaturated carbonyl. An example of such a repeat unit includes:

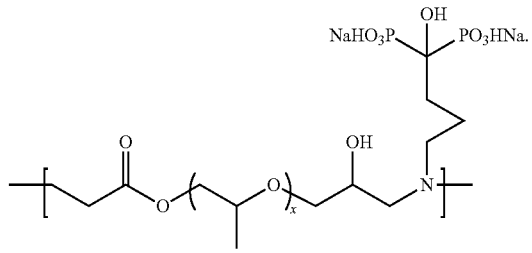

Examples of repeat unit A-C-B-C (and variants thereof, as disclosed herein) include those obtained from a derivative of (B) (e.g., polyether) comprising glycidyl ether and a α,β-unsaturated sulfonyl. An example of such a repeat unit includes:

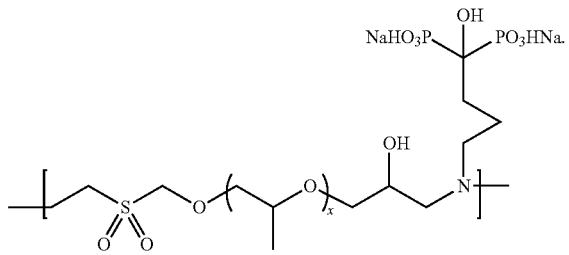

In one embodiment, the (A) repeat unit is derived from a primary amine, as described herein. In one embodiment, (A) repeat unit comprises repeat units $A_1$ and $A_2$ (two different repeat units), which can be achieved by reacting two different primary amines with a reagent comprising the (C) repeat unit. In one embodiment, the polymer comprises the repeat unit $A_1$-C-B-C-$A_2$-C-B-C.

Variants of this repeat unit include $A_1$-C-X-B-C-$A_2$-C-X-B-C $A_1$-C-B-X-C-$A_2$-C-B-X-C $A_1$-C-$X_1$-B-$X_2$-C-$A_2$-C-$X_1$-B-$X_2$-C.

It is understood that (B) and (C) can also vary among each variant.

In one embodiment, the (B) repeat unit comprises repeat units $B_1$ and $B_2$ (two different repeat units) to form a polymer comprising the repeat unit:

A-C-$B_1$-C-A-C-$B_2$-C.

Variants include:

A-C-X-$B_1$-C-A-C-X-$B_2$-C

A-C-$B_1$-X-C-A-C-$B_2$-X-C

A-C-$X_1$-$B_1$-$X_2$-C-A-C-$X_1$-$B_2$-$X_2$-C.

It is understood that (A) and (C) can also vary among each variant.

For example, $B_1$ can be a polyether and $B_2$ can be a bisphenol. One example of a polymer having two different (B) repeat units has the structure:

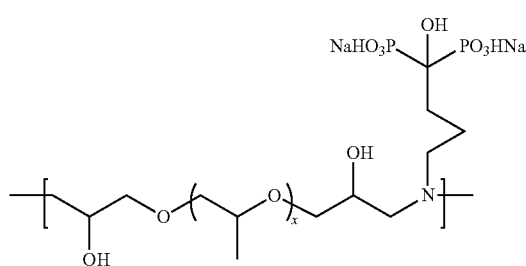

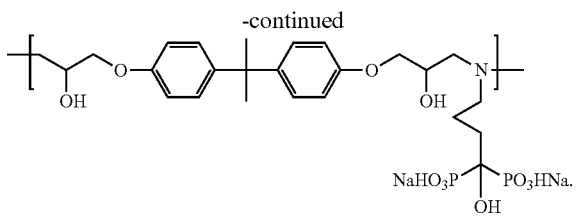

These (B) repeat units can be obtained from diglycidyl ether derivatives of polyethers (e.g., polyalkylene glycol) and of bisphenols (e.g., bisphenol A).

In one embodiment, the number of A-C-B-C repeat units (or other variants disclosed herein) in the polymer ranges from 2 to 300, e.g., from 2 to 250, from 2 to 200, from 2 to 150, from 2 to 100, from 2 to 60, or from 2 to 50. In one embodiment, the polymer has a molecular weight ($M_n$) ranging from 1,000 to 150,000, e.g., from 1,000 to 100,000, from 1,000 to 75,000, from 1,000 to 50,000, from 1,000 to 30,000, from 2,000 to 150,000, from 2,000 to 100,000, from 2,000 to 75,000, from 2,000 to 50,000, or from 2,000 to 30,000.

In one embodiment, a polymer comprising repeat units (A), (B), and (C) can optionally contain other repeat units that do not have the structures (A), (B), and (C). In one embodiment, in addition to having repeat units (A), (B), and (C), as disclosed herein, the polymer further comprises a repeat unit having the formula:

D-C-B-C where repeat units (B) and (C) are as described above, and (D) is selected from amines, polyamines, thioethers, and polythioethers. As also disclosed herein, (C) can be bonded to (B) and (D) via linker group X, or linker groups $X_1$ and $X_2$, resulting in the following repeat units:

D-C-X-B-C,

D-C-B-X-C, and

D-C-$X_1$-B-$X_2$-C.

The repeat unit (D) can be selected to affect the amphoterism and/or hydrophobicity of the polymer. In one embodiment, (D) is selected from amines, such as $C_1$-$C_{10}$ alkylamines, $C_4$-$C_{18}$ arylamines, $C_3$-$C_{20}$ heterocycloalkylamines, and $C_4$-$C_{18}$ arylamines. (D) can be derived from amines having an —$NH_2$ group or amines having two —NH groups. For example, $C_1$-$C_{10}$ alkylamines or $C_4$-$C_{18}$ arylamines can be derived from primary amines (having an —$NH_2$ group), or from diamines in which each amine is a secondary amine and comprises an —NH group. In one embodiment, the $C_3$-$C_{20}$ heterocycloalkylamines and $C_4$-$C_{18}$ heteroarylamines contain at least two nitrogen ring atoms. These heterocycles can be derived from heterocycloalkylamines and heteroarylamines having two ring —NH groups. Examples of such heterocycloalkylamines and heteroarylamines include piperazine, 4,4'-bipiperidine, 4,4'-ethylenedipiperidine, and 4,4'-trimethylenedipiperidine.

In one embodiment, (D) does not contain a functional group or groups having a calcium index value greater than or equal to a calcium index value of phenylphosphonic acid.

In one embodiment, if present, the number of D-C-B-C repeat units (or other variants disclosed herein) in the polymer ranges from 1 to 300, e.g., from 2 to 300, from 2 to 250, from 2 to 200, from 2 to 150, from 2 to 100, from 2 to 60, from 2 to 50, or from 1 to 50.

In one example, a heterocycloalkylamine having two ring —NH groups, such as piperazine, can be reacted with a diglycidyl ether such as an alkylene glycol (e.g., polypropylene glycol) diglycidyl ether. One example of a second repeat unit incorporating piperazine as a (D) repeat unit has the structure:

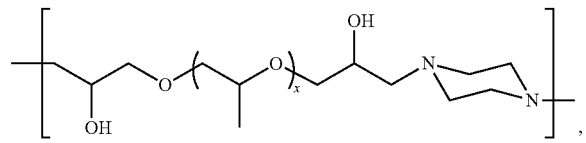

where x ranges from 2 to 100, or other ranges of (B) repeat units as disclosed herein. The piperazine nitrogen ring atoms are basic and can be protonated, thereby capable of affecting the overall charge and thus, the amphoteric nature of the polymer.

First and second repeat units A-C-B-C and D-C-B-C (and variants described herein) can be present in a single polymer. Exemplary monomers that can be present in the same polymer include:

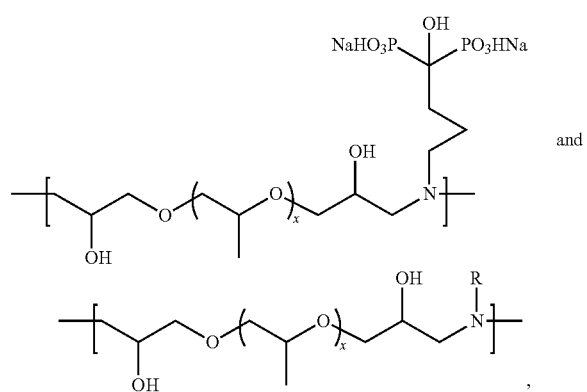

where R=3-hydroxypropyl, N-butyl, N-hexyl, or N-benzyl, and x is defined as above. In this example, the first repeat unit includes monomer (A) having a functional group, (e.g., —$CH_2CH_2CH_2C(OH)(PO_3HNa)_2$) having a calcium index value greater than that of phenylphosphonic acid. In the second repeat unit, the monomer (D) (e.g., NR) does not include a functional group but does include a basic nitrogen group that can be protonated. Thus, the monomer (D) is capable of affecting the overall charge and thus, affecting the amphoteric nature of the polymer. Alternatively, the second repeat unit can incorporate a ring structure having two NH groups (e.g., piperazine), as disclosed herein.

Other repeat units can be added to alter the hydrophobicity of the polymer. In one embodiment, (D) is selected from $C_2$-$C_{20}$ thioethers and polythioethers, e.g., containing —S—($C_2$-$C_{20}$ alkyl)-S— or —S—($C_{4-18}$ aryl)-S—. In one embodiment, the thioethers and polythioethers are derived from thiols having two —SH groups. In one embodiment, the thioether or polythioether is derived from the reaction of an alkylenedithiol (e.g., ethanedithiol, propanedithiol, 1,4-butanedithiol, 2,3-butanedithiol, 1,5-pentanedithiol, 2,2'-(ethylenedioxy)diethanethiol, 2,2'-thiodiethanethiol, 2-mercaptoethyl ether, etc.) and a diglycidyl ether such as an alkylene glycol (e.g., propylene glycol) diglycidyl ether.

One example of a second repeat unit D-C-B-C (and variants disclosed herein) in which (D) is a thioether has the structure:

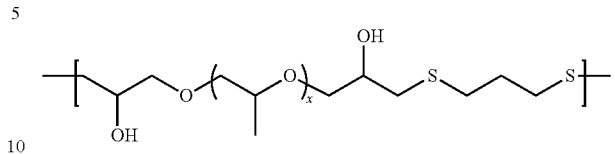

where x ranges from 2 to 100, or other ranges of (B) repeat units as disclosed herein. Increasing the number of such second repeat units can increase the overall hydrophobicity of the polymer.

Other first and second repeat units A-C-B-C and D-C-B-C (and variants of each disclosed herein) that can be present in a single polymer are represented by the structures:

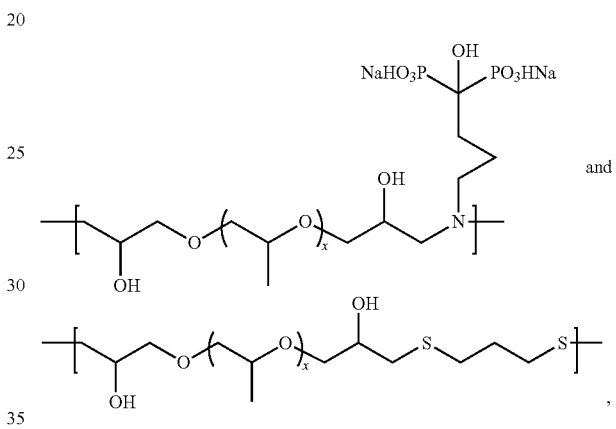

where x is as defined above. In this example, the first repeat unit includes monomer (A) having a functional group (e.g., —$CH_2CH_2CH_2C(OH)(PO_3HNa)_2$) having a calcium index value greater than that of phenylphosphonic acid. In the second repeat unit, monomer (D) does not include a functional group or a basic nitrogen group, but it is capable of tuning the length of hydrophobic units, thus affecting the hydrophobicity of the polymer.

One embodiment provides a method of making a polymer comprising the repeat units (A) and (B), the method comprising:

reacting at least one monomer having the structure H-A-H with at least one second monomer comprising (B) bonded to at least one group selected from glycidyl ethers, α,β-unsaturated carbonyls, and α,β-unsaturated sulfonyls, wherein (A) is selected from —N($R_1$)— and —$N^+$($R_1$)($R_2$)—, $R_1$ is selected from $C_1$-$C_{10}$ alkyl, $C_4$-$C_{18}$ aryl, $C_4$-$C_{18}$ heteroaryl, and $C_3$-$C_{20}$ heterocycloalkyl, each being substituted with at least one functional group; $R_2$ is selected from $C_1$-$C_{10}$ alkyl, $C_4$-$C_{18}$ aryl, $C_1$-$C_{10}$ alkyl substituted with at least one functional group, and $C_4$-$C_{18}$ aryl substituted with at least one functional group, wherein $R_1$, or $R_1$ and $R_2$ together, has a calcium index value greater than or equal to a calcium index value of phenylphosphonic acid, and wherein (B) is selected from $C_1$-$C_{10}$ alkylene; $C_3$-$C_{20}$ cycloalkylene; $C_3$-$C_{20}$ heterocycloalkylene; arylene; heteroarylene; $C_2$-$C_{20}$ ether; $C_2$-$C_{20}$ thioether; $C_2$-$C_{20}$ ester; $C_2$-$C_{20}$ acetal; $C_2$-$C_{20}$ amide; bisphenols; and oligomer and polymer moieties selected from polyether, polyester, polyamines, polycarbonate, polyacetal, polythioether, polyester amide, polyurethane, polyacrylate, polyolefin, and polyalkylsiloxane.

In one embodiment, the H-A-H monomer reacts with the glycidyl ethers, α,β-unsaturated carbonyl group, and/or the α,β-unsaturated sulfonyl to produce a third repeat unit (C), which is selected from:
(i) —C($R_3$)($R_4$)—C($R_5$)(OH)—(C($R_6$)($R_7$))$_m$—,
(ii) —C($R_3$)($R_4$)—C($R_5$)(H)—C(O)—, and
(iii) —C($R_3$)($R_4$)—C($R_5$)(H)—S(O)(O)—; and Other (C) repeat units are disclosed herein.

In one embodiment, the polymer can comprise an additional repeat unit (D) as disclosed herein. Accordingly, the method further comprises reacting at least one third monomer with the at least one monomer and at least one second monomer, the at least one third monomer selected from: amines having one —$NH_2$ group; diamines and polyamines having two —NH groups; and thiols having two —SH groups.

In one embodiment, $R_1$ and/or $R_2$ comprises a functional group comprising an acid. The number of acid groups can quantify the number of potential charged species. For example, where the acid ionizes to an anion, the number of anionic groups can be determined, thereby indicating the overall charge of the polymer.

In one embodiment, the number of acid (e.g., anionic) groups can be determined by acid number (AN). Acid number can be is calculated by using the amounts of acid-containing monomer based on the following equation:

AN=moles of acid-containing monomer×56.1 mg KOH/mol×$n$×1000/(the total mass (g) of polymer sample), where $n$=number of moles of ionizable protons per mole of acid-containing monomer.

Exemplary acids for functional groups include —COOH, —$SO_3H$, —$OSO_3H$, —$HPO_3H$, —$OPO_3H$, and —$PO_3H$. In one embodiment, the acid number is at least 30, e.g., at least 40.

The (A) repeat unit includes an amine or ammonium group, which can indicate the number of positive or potentially positively charged species. Optionally, other amine-based repeat units that do not contain functional groups can be incorporated as described above, where these additional amine or ammonium groups can be positive or potentially positively charged. In one embodiment, the number of amine groups can be indicated by an amine number (AmineNum). The amine number can be calculated by using the amounts of amino-containing monomer based on the following equation:

AmineNum=moles of amino-containing monomer× 56.1 mg KOH/mol×$n$×1000/(the total mass (g) of polymer sample), where $n$=number of moles of basic nitrogens per moles of amino-containing monomer.

In one embodiment, the acid number is greater than the amine number.

In one embodiment, control of the overall charge of the polymer (e.g., by pH, choice of (A), (B), or (C) repeat units, optional amines, etc.), hydrophobicity, functional groups, etc. can affect one or more properties of the polymer such as hydrophobicity and Tg, which can in turn affect one or more printing performance properties such as OD, mottle, and durability.

In one embodiment, the amphoteric polymers disclosed herein have at least one endcapping group selected from amines (e.g., secondary amines) and hydroxyls. For example, the reaction to bind monomers (A) and (C) can involve a reaction between a primary amine and an epoxy group. Depending on the ratio of the reactants, the resulting end group can be a secondary amine or an epoxy, which can be subsequently hydrolyzed to form hydroxyl groups.

Calcium Index Value

As used herein, the term "calcium index value" refers to a measure of ability of $R_1$ alone, or $R_1$ and $R_2$ in combination, to coordinate or bind calcium ions in solution. The higher the calcium index value, the more strongly or effectively the group can coordinate calcium ions. Such a value can be determined using any method known in the art. For example, the calcium index value may be measured using a method in which the amount of calcium coordinated by a compound in a standard solution containing soluble calcium ions and a color indicator is measured using UV-Vis spectroscopy. In addition, for compounds having a strong color, the calcium index value may be measured using an NMR method.

In one embodiment, "calcium index value," is calculated according to the methods (Method A or Method B) described in U.S. Pat. No. 8,858,695, e.g., col. 29, line 45 to col. 31, line 37, the disclosure of which is incorporated herein by reference. For either method used, a compound was chosen that corresponds to a desired functional group to be tested. In the test compound, the functional group can be bonded to any residue so long as the atoms responsible for binding calcium ions are separated from the residue by at least two bonds. The residue can comprise or consist of hydrogen, a $C_1$-$C_{10}$ alkyl (substituted or unsubstituted), or $C_4$-$C_{18}$ aryl (substituted or unsubstituted), e.g., the compound can comprise a functional group bonded to hydrogen, a $C_1$-$C_{10}$ alkyl (substituted or unsubstituted), or $C_4$-$C_{18}$ aryl (substituted or unsubstituted). For example, for a 3,4,5-tricarboxyphenyl functional group and salts thereof, 1,2,3-benzene tricarboxylic acid can be chosen. In this example, the residue is hydrogen and the oxygen atoms of the carboxylic acids are at least two bonds away from the hydrogen residue.

In one embodiment, reference to the calcium index value means that the value is greater than or equal to that of a reference material. In one embodiment, the reference is phenylphosphonic acid. Thus, $R_1$ alone, or $R_1$ and $R_2$ in combination, has a calcium index value that is greater than or equal to the calcium index value of phenyl phosphonic acid. In one embodiment, the calcium index value is greater than or equal to 2.8, e.g., greater than or equal to 3.0, or greater than or equal to 3.2, as determined using UV-Vis spectroscopy (or method A), as described in more detail below.

Method A.

For this method, a series of solutions were prepared at pH 9 that contained 0.087 mM Congo Red indicator, 5 mM cesium chloride, 1 wt % MW350 polyethylene glycol methyl ether, and calcium chloride in concentrations ranging from 0 to 7 mM (0.2, 0.5, 1, 2, 3, 4, 4.5, 5, 6, and 7 mM). The UV-Vis spectra of these solutions were recorded within 1 hour of their preparation using a UV-2501PC. These spectra were used to create a calibration curve relating the absorbance at 520 nm to the calcium concentration.

Test solutions were then prepared at pH 9 that contained 0.087 mM Congo Red indicator, 1 wt % MW350 polyethylene glycol methyl ether, 5 mM calcium chloride, and the cesium salt of the compound of interest such that the ion concentration at pH 9 was 5 mM. The uncomplexed calcium concentration was determined by comparison with the calibration curve. The calcium index value was then calculated as $\log_{10}((0.005-\text{uncomplexed calcium})/((\text{uncomplexed calcium})^2))$. Measurements were made in duplicate and averaged.

Method B.

For compounds that develop a high level of color and are therefore difficult to use in Method A, a second method was developed. For this method, an aqueous solution that was 0.01M in $^{43}CaCl_2$, 0.01M in NaCl, 10% $D_2O$ and at pH 8 or 9 was prepared from $^{43}CaCO_3$, $HCl/D_2O$, $NaOH/D_2O$, D2O and water. The pH was chosen to ionize the compound under investigation and to dissolve the compound. A portion of the solution weighing about 0.65 g was added to a 5 mm NMR tube and weighed to the nearest 0.001 g. The chemical shift of the unbound $^{43}Ca$ was measured using a Bruker Avance II spectrometer with a proton resonance frequency at 400.13 MHz. A 0.2-1.0M solution of the compound (ligand) under investigation was added in successive increments. After each addition, the $^{43}Ca$ chemical shift was measured, and 6, the difference between the chemical shift of the sample and that of unbound calcium was calculated. The successive increments were planned such that the $L_o/Ca_o$ ratio was 0.25, 0.5, 1, 2, 3, 4, 6 and 8 where $L_o$ is the total concentration of complexed, protonated and free anions from the ligand and $Ca_o$ is the total concentration of calcium in all species present. The calcium index value (NMR) was calculated as $\log_{10}(X)$ where X was determined by fitting the parameters X and $\delta_m$ in the equation:

$$\delta = \frac{\delta_m}{2}\left\{[1 + (L_0/Ca_0) + (1 + H^+/K_a)/(XCa_0)] - \sqrt{[1 + (L_0/Ca_0) + (1 + H^+/K_a)/(XCa_0)]^2 - 4(L_0/Ca_0)}\right\}$$

so that the RMS difference between the data and the predicted chemical shifts from the equation are minimized where:

$\delta$ is the difference in the $^{43}Ca$ chemical shift of the sample vs that of free aqueous $^{43}Ca^{2+}$;

$\delta_m$ is the calculated difference in the $^{43}Ca$ chemical shift at infinite L/Ca vs that of free $^{43}Ca^{2+}$;

$L_o$ is the total concentration of complexed, protonated and free anions from the ligand;

$Ca_o$ is the total concentration of calcium in all species present;

X is a fitting parameter; and $K_a$ is the proton dissociation constant for the ligand LH.

Functional Groups

As disclosed herein, repeat unit (A) can be $-N^+(R_1)(R_2)-$ and/or $-N(R_1)-$. In one embodiment, for either type of repeat unit (A), $R_1$ is selected from $C_1$-$C_{10}$ alkyl, $C_4$-$C_{18}$ aryl, $C_4$-$C_{18}$ heteroaryl, and $C_3$-$C_{20}$ heterocycloalkyl, each being substituted with at least one functional group. Alternatively stated, $R_1$ is selected from $C_1$-$C_{10}$ alkyl substituted with at least one functional group, $C_4$-$C_{18}$ aryl substituted with at least one functional group, $C_4$-$C_{18}$ heteroaryl substituted with at least one functional group, and $C_3$-$C_{20}$ heterocycloalkyl substituted with at least one functional group.

In one embodiment, $R_1$, or $R_1$ and $R_2$ together, has a calcium index value greater than or equal to a calcium index value of phenylphosphonic acid. In one embodiment, the functional group of $R_1$ itself has a calcium index value greater than or equal to a calcium index value of phenylphosphonic acid. In this embodiment, $R_2$ can be free of a functional group having calcium index value greater than or equal to a calcium index value of phenylphosphonic acid, or $R_2$ can be free of any functional group. For example, $R_2$ can be selected from hydrogen, $C_1$-$C_{10}$ alkyl, and $C_4$-$C_{18}$ aryl.

In another embodiment, the nitrogen atom of (A) can bind both $R_1$ and $R_2$ (forming an ammonium species) in which each of $R_1$ and $R_2$ contains a functional group. The combined functional groups of $R_1$ and $R_2$ can lead to $R_1$ and $R_2$ together having a calcium index value greater than or equal to a calcium index value of phenylphosphonic acid.

In one embodiment, $R_1$ is selected from $C_1$-$C_{10}$ alkyl substituted with at least one functional group and $C_4$-$C_{18}$ aryl substituted with at least one functional group; $R_2$ is selected from H, $C_1$-$C_{10}$ alkyl, and $C_4$-$C_{18}$ aryl; and wherein $R_1$ has a calcium index value greater than or equal to a calcium index value of phenylphosphonic acid.

In one embodiment, $R_1$ is selected from $C_1$-$C_{10}$ alkyl substituted with at least one functional group and $C_4$-$C_{18}$ aryl substituted with at least one functional group; $R_2$ is selected from H and $C_1$-$C_{10}$ alkyl; and wherein $R_1$ has a calcium index value greater than or equal to a calcium index value of phenylphosphonic acid.

In one embodiment, the at least one functional group comprises at least one ionic group, at least one ionizable group, or mixtures thereof. An ionic group can be either anionic or cationic and can be associated with a counterion of the opposite charge including inorganic or organic counterions, such as $Na^+$, $K^+$, $Li^+$, $NH_4^+$, $NR'_4^+$, acetate, $NO_3^-$, $SO_4^{-2}$, $R'SO_3^-$, $R'OSO_3^-$, $OH^-$, or $Cl^-$, where R' represents hydrogen or an organic group, such as a substituted or unsubstituted aryl or alkyl group. In one embodiment, the positive and negative charges of an amphoteric polymer can be internally compensated. The ionic group may be in the form of a salt, e.g., a partially or fully ionized form having a counterion. An ionizable group is one that is capable of forming an ionic group in the medium of use. The ionizable group may be in the form of an acid group or an ester group, e.g., all or a portion of acid groups are converted to esters, such as alkyl or aryl esters. Anionic groups are negatively charged ionic groups that can be generated from groups having ionizable substituents that can form anions (anionizable groups), such as acidic substituents. Cationic groups are positively charged organic ionic groups that can be generated from ionizable substituents that can form cations (cationizable groups), such as protonated amines. Specific examples of anionic groups include $-COO^-$, $-SO_3^-$, $-OSO_3^-$, $-HPO_3^-$, $-OPO_3^{-2}$, or $-PO_3^{-2}$; and specific examples of an anionizable group can include $-COOH$, $-SO_3H$, $-PO_3H_2$, $-R'SH$, or $-R'OH$, where R' represents hydrogen or an organic group, such as a substituted or unsubstituted aryl or alkyl group. Also, specific examples of cationic or cationizable groups include alkyl or aryl amines, which can be protonated in acidic media to form ammonium groups $-NR'_2H^+$, where R' represent an organic group, such as a substituted or unsubstituted aryl or alkyl groups. Organic ionic groups include those described in U.S. Pat. No. 5,698,016, the disclosure of which is incorporated herein by reference.

In one embodiment, $R_1$, or $R_1$ and $R_2$ in combination, comprise at least one functional group that is ionic and/or ionizable and is capable of chelating calcium ions to the extent that $R_1$, or $R_1$ and $R_2$ in combination, has a calcium index value greater than or equal to a calcium index value of phenylphosphonic acid.

In one embodiment, the at least one functional group comprises at least one phosphorus-containing group having at least one P—O or P=O bond, such as at least one phosphonic acid group, at least one phosphinic acid group, at least one phosphinous acid group, at least one phosphite group, at least one phosphate, diphosphate, triphosphate, or pyrophosphate groups, partial esters thereof, and salts thereof. For example, the functional group comprises at least one phosphonic acid group, partial ester thereof, or salt thereof. In one embodiment, the at least one functional group comprises at least two of these groups, such as at least two phosphonic acid groups, partial esters thereof, and salts thereof. By "partial ester thereof" is meant that the phosphonic acid group may be a partial phosphonic acid ester group having the formula —$PO_3RH$, or a salt thereof, wherein R is an aryl, alkaryl, aralkyl, or alkyl group. When the at least one functional group comprises at least two phosphonic acid groups and salts thereof, either or both of the phosphonic acid groups may be a partial phosphonic ester group. Also, one of the phosphonic acid groups may be a phosphonic acid ester having the formula —$PO_3R_2$ while the other phosphonic acid group may be either a partial phosphonic ester group, a phosphonic acid group, or a salt thereof. In one embodiment, at least one of the phosphonic acid groups is either a phosphonic acid, a partial ester thereof, and salts thereof. By "salts thereof" is meant that the phosphonic acid group may be in a partially or fully ionized form having a cationic counterion. When the at least one functional group comprises at least two phosphonic acid groups, either or both of the phosphonic acid groups may be in either a partially or fully ionized form. In one embodiment, the at least one functional group comprises at least two phosphonic acid groups, wherein either or both may have the formula —$PO_3H_2$, —$PO_3H^-M^+$ (monobasic salt), or —$PO_3^{-2}M^+_2$ (dibasic salt), wherein $M^+$ is a cation such as $Na^+$, $K^+$, $Li^+$, or $NR_4^+$, wherein R, which can be the same or different, represents hydrogen or an organic group such as a substituted or unsubstituted aryl and/or alkyl group.

In one embodiment, the at least one functional group may comprise at least one geminal bisphosphonic acid group, partial esters thereof, and salts thereof, that is, the at least one functional group may comprise at least two phosphonic acid groups, partial esters thereof, and salts thereof that are directly bonded to the same carbon atom. Such a group may also be referred to as a 1,1-diphosphonic acid group, partial ester thereof, or salt thereof. Thus, for example, the at least one functional group may comprise a group having the formula —$CQ(PO_3H_2)_2$, partial esters thereof, and salts thereof. Q is bonded to the geminal position and may be H, R, OR, SR, or $NR_2$ wherein R, which can be the same or different, is H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. For example, Q may be H, R, OR, SR, or $NR_2$, wherein R, which can be the same or different, is H, a $C_1$-$C_6$ alkyl group, or an aryl group. In one embodiment, Q is H, OH, or $NH_2$. Furthermore, the at least one functional group may comprise a group having the formula —$(CH_2)_n$—$CQ(PO_3H_2)_2$, partial esters thereof, and salts thereof, wherein Q is as described above and n is 0 to 9, such as 1 to 9, 0 to 3, or 1 to 3. In one embodiment, n is either 0 or 1. Also, the at least one functional group may comprise a group having the formula —Y—$(CH_2)_n$—$CQ(PO_3H_2)_2$, partial esters thereof, and salts thereof, wherein Q and n are as described above and Y is an arylene, heteroarylene, alkylene, vinylidene, alkarylene, aralkylene, cyclic, or heterocyclic group. In one embodiment, Y is an arylene group, such as a phenylene, naphthalene, or biphenylene group, which may be further substituted with any group, such as one or more alkyl groups or aryl groups.

When Y is an alkylene group, examples include, but are not limited to, substituted or unsubstituted alkylene groups, which may be branched or unbranched and can be substituted with one or more groups, such as aromatic groups. Examples include, but are not limited to, $C_1$-$C_{12}$ groups like methylene, ethylene, propylene, or butylene, groups.

Y may be further substituted with one or more groups selected from, but not limited to, R', OR', COR', COOR', OCOR', carboxylates, halogens, CN, $NR'_2$, $SO_3H$, sulfonates, sulfates, NR'(COR'), $CONR'_2$, imides, $NO_2$, phosphates, phosphonates, N=NR', SOR', $NR'SO_2R'$, and $SO_2NR_2'$, wherein R' which can be the same or different, is independently hydrogen, branched or unbranched $C_1$-$C_{20}$ substituted or unsubstituted, saturated or unsaturated hydrocarbons, e.g., alkyl, alkenyl, alkynyl, substituted or unsubstituted aryl, substituted or unsubstituted heteroaryl, substituted or unsubstituted alkaryl, or substituted or unsubstituted aralkyl.

In one embodiment, the at least one functional group may comprise a group having the formula —Y-Sp-$(CH_2)_n$—$CQ(PO_3H_2)_2$, partial esters thereof, or salt thereof, wherein Y, Q and n are as described above. Sp is a spacer group, which, as used herein, is a link between two groups. Sp can be a bond or a chemical group. Examples of chemical groups include, but are not limited to, —$CO_2$—, —$O_2C$—, —CO—, —$OSO_2$—, —$SO_3$—, —$SO_2$—, —$SO_2C_2H_4O$—, —$SO_2C_2H_4S$—, —$SO_2C_2H_4NR''$—, —O—, —S—, —NR''—, —NR''CO—, —CONR''—, —NR''$CO_2$—, —$O_2$CNR''—, —NR''CONR''—, —N(COR'')CO—, —CON(COR'')—, —NR''COCH($CH_2CO_2R''$)— and cyclic imides therefrom, —NR''$COCH_2$CH($CO_2R''$)— and cyclic imides therefrom, —CH($CH_2CO_2R''$)CONR''— and cyclic imides therefrom, —CH($CO_2R''$)$CH_2$CONR'' and cyclic imides therefrom (including phthalimide and maleimides of these), sulfonamide groups (including —$SO_2NR''$— and —NR''$SO_2$— groups), arylene groups, alkylene groups and the like. R'', which can be the same or different, represents hydrogen or an organic group such as a substituted or unsubstituted aryl or alkyl group. As shown by the structure above, a group comprising at least two phosphonic acid groups and salts thereof is bonded to Y through the spacer group Sp. In one embodiment, Sp is —$CO_2$—, —$O_2C$—, —O—, —NR''CO—, or —CONR''—, —$SO_2NR''$—, —$SO_2CH_2CH_2NR''$—, —$SO_2CH_2CH_2O$—, or —$SO_2CH_2CH_2S$—, wherein R'' is H or a $C_1$-$C_6$ alkyl group.

In addition, the at least one functional group may comprise at least one group having the formula —CR=C$(PO_3H_2)_2$, partial esters thereof, and salts thereof. R can be H, a $C_1$-$C_{18}$ saturated or unsaturated, branched or unbranched alkyl group, a $C_1$-$C_{18}$ saturated or unsaturated, branched or unbranched acyl group, an aralkyl group, an alkaryl group, or an aryl group. In one embodiment, R is H, a $C_1$-$C_6$ alkyl group, or an aryl group.

For this embodiment, the at least one functional group may comprise more than two phosphonic acid groups, partial esters thereof, and salts thereof and may, for example comprise more than one type of group (such as two or more) in which each type of group comprises at least two phosphonic acid groups, partial esters thereof, and salts thereof. For example, the at least one functional group may comprise a group having the formula —Y—$[CQ(PO_3H_2)_2]_p$, partial esters thereof, or salt thereof. Y and Q are as described above. In one embodiment, Y is an arylene, heteroarylene, alkylene, alkarylene, or aralkylene group. In this formula, p is 1 to 4, e.g., p is 2.

In one embodiment, the at least one functional group may comprise at least one vicinal bisphosphonic acid group, partial ester thereof, and salts thereof, meaning that these groups are adjacent to each other. Thus, the at least one functional group may comprise two phosphonic acid groups, partial esters thereof, and salts thereof bonded to adjacent or neighboring carbon atoms. Such groups are also sometimes referred to as 1,2-diphosphonic acid groups, partial esters thereof, and salts thereof. The group comprising the two phosphonic acid groups, partial esters thereof, and salts thereof may be an aromatic group or an alkyl group, and therefore the vicinal bisphosphonic acid group may be a vicinal alkyl or a vicinal aryl diphosphonic acid group, partial ester thereof, and salts thereof. For example, the at least one functional group may be a group having the formula $-C_6H_3-(PO_3H_2)_2$, partial esters thereof, and salts thereof, wherein the acid, ester, or salt groups are in positions ortho to each other.

In one embodiment, the functional group of each of $R_1$ and $R_2$ may comprise at least one phosphonic acid groups, partial esters thereof, and salts thereof, and thus in combination, $R_1$ and $R_2$ provide the calcium index values disclosed herein.

In one embodiment, the at least one functional group comprises at least one phosphonic acid group or a salt thereof and at least one second ionic, ionizable, or basic group vicinal or geminal to the phosphonic acid group, and salts thereof.

In one embodiment, the at least one functional group is selected from $-C(OH)(PO_3H_2)_2$, $-CH_2C(OH)(PO_3H_2)_2$, $-CH_2CH_2C(OH)(PO_3H_2)_2$, $-CH_2CH_2CH_2C(OH)(PO_3H_2)_2$, $-CH(PO_3H_2)_2$, $-CH_2CH(PO_3H_2)_2$, partial esters thereof, and salts thereof.

In one embodiment, the at least one functional group comprises at least one heterocyclic group (e.g., a heteroaryl group) having at least one OH group, e.g., at least two OH groups, and salts thereof. The heterocyclic group can be a nitrogen-containing heteroaryl group, such as a pyridinyl group or a quinolinyl group, and the at least one functional group is a hydroxy pyridinyl group or a hydroxy quinolinyl group. The hydroxy group can be positioned on the heteroaryl group such that it is geometrically close to the heteroatom, such as ortho to the heteroatom. Such a group may be in the salt form. For example, the at least one functional group may comprise a 2-hydroxy pyridinyl group or a 2-hydroxy-quinolinyl group, as well as an 8-hydroxy-quinolinyl group and salts thereof. Other isomers or tautomers will also be known to one skilled in the art. In one embodiment, the at least one functional group comprises an 8-hydroxy-quinolinyl group. In addition, the at least one functional group may further comprise additional functional groups, including those described above for Y. For example, electron withdrawing groups, such as chloro or nitro groups, may be included in order to lower the pKa of the OH group. In one embodiment, the functional group of each of $R_1$ and $R_2$ may comprise at least one heterocyclic group (e.g., a heteroaryl group) having at least one OH group, and salts thereof.

In one embodiment, the at least one functional group may also comprise at least one heteroaryl group having at least two OH groups. When there are two OH groups, the OH groups can be in positions ortho to each other on the heteroaryl group. When there are more than two OH groups, at least two of the OH groups are in positions ortho to each other on the heteroaryl group. For example, the at least one functional group may be a dihydroxy-pyridinyl group, such as a 2,3-dihydroxy-pyridinyl group (which can also be referred to as a 3-hydroxy-2-pyridonyl group), a 3,4-dihydroxy-pyridinyl group (which can also be referred to as a 3-hydroxy-4-pyridonyl group), a 2,3-dihydroxy-quinolinyl group (which can also be referred to as 3-hydroxy-2-quinolonyl group), or a 3,4-dihydroxy-quinolinyl group (which can also be referred to as a 3-hydroxy-4 quinolonyl group). Other isomers and tautomers will also be known to one skilled in the art.

In one embodiment, the at least one functional group comprises at least one phosphonic acid group, a partial ester thereof, and salts thereof and at least one second ionic, ionizable group, or basic group. The second group is not a phosphonic acid group or salt thereof. In one embodiment, the second ionic or ionizable group is a carboxylic acid group, a sulfonic acid group, or a salt thereof. In one embodiment, the basic group is a Lewis base, such as an OH group (a hydroxyl group) or an amino group. In one embodiment, these two groups are geminal to each other, by which is meant, are directly bonded to the same carbon atom. Thus, for example, when the second ionic or ionizable group is a carboxylic acid group or salt thereof, the at least one functional group may comprise a group having the formula $-CQ(PO_3H_2)(CO_2H)$ and salts thereof. Q, which is bonded to the geminal position, may be any of those described above. In one embodiment, Q is H. In addition, the at least one functional group may comprise a group having the formula $-(CH_2)_n-CQ(PO_3H_2)(CO_2H)$ and salts thereof, wherein n is 0 to 9, e.g., 0 to 3. Furthermore, the at least one functional group may comprise a group having the formula $-Y-(CH_2)_n-CQ(PO_3H_2)(CO_2H)$ or salt thereof, wherein Y is as described above. In one embodiment, Y is an arylene group. Also, the at least one functional group may comprise a group having the formula $-Y-Sp-(CH_2)_n-CQ(PO_3H_2)(CO_2H)$ or salt thereof, wherein Y and Sp, which is a spacer group, are as described above. In one embodiment, Y is an arylene group. In one embodiment, the functional group of $R_1$ comprises at least one phosphonic acid group, a partial ester thereof, and salts thereof, and the functional group of $R_2$ at least one second ionic, ionizable group, or basic group.

In one embodiment, the at least one functional group may comprise at least one phosphonic acid group, a partial ester thereof, and salts thereof and at least one hydroxy group or salt thereof, such as a group having the formula $-Y-(PO_3H_2)(OH)$ and salts thereof, wherein Y is as described above. In one embodiment, Y is an arylene group and the phosphonic acid group and hydroxy group are in positions ortho to each other. When these groups are geminal, the at least one functional group may comprise at least one group having the formula $-CR(PO_3H_2)(OH)$ and salts thereof, wherein R is H or a C1-C6 alkyl group. In one embodiment, R is H. Also, the at least one functional group may comprise at least one group having the formula $-(CH_2)_n-CR(PO_3H_2)(OH)$ and salts thereof, wherein n is 0 to 9, e.g., 0 to 3. Furthermore, the at least one functional group may comprise a group having the formulas $-Y-(CH_2)_n-CR(PO_3H_2)(OH)$ and salts thereof or $-Y-Sp-(CH_2)_n-CR(PO_3H_2)(OH)$ and salts thereof, wherein Y and Sp are as described above.

In one embodiment, the at least one functional group comprises an aryl or alkyl polyacid group having at least three carboxylic acids. In one embodiment, at least two of the carboxylic acid groups are vicinal, meaning that they are bonded to adjacent atoms (e.g., adjacent carbon atoms). For example, the at least one functional group is an aryl polyacid group having at least three carboxylic acids, such as 1,2,3- or 1,2,4-tricarboxylic acid, a 1,2,3,4- or 1,2,4,5-tetra carboxylic acid group.

In one embodiment, the at least one functional group comprises a heteroaryl group having at least one carboxylic acid group or salt thereof. The heteroaryl group may be any of those known in the art. In one embodiment, the heteroaryl group is a nitrogen containing heteroaryl group, such as a pyridinyl group, a pyrimidinyl group, a pyrrolyl group, a quinolinyl group, or a pyrazinyl group. In one embodiment, the at least one functional group comprises two carboxylic acid groups and salts thereof. These acid groups may be anywhere on the heteroaryl ring. In one embodiment, the acid groups can be either ortho or meta to each other. Furthermore, when the heteroaryl group contains at least one nitrogen atom, the two acid groups can be both adjacent to (that is, ortho to) the nitrogen atom. Thus, for example, the heteroaryl group may be a 2,6-pyridinyl-dicarboxylic acid group.

In one embodiment, the at least one functional group comprises an aryl group having at least one nitroso group and at least one OH group, or a salt thereof. The two groups may be located anywhere on the aryl group. In one embodiment, the aryl group is a phenyl group and the nitroso and OH groups are in positions ortho to each other. The aryl group may further comprise other substituents, such as alkyl groups, halogen groups, ether groups and the like, including electron withdrawing groups, such as chloro and nitro groups, capable of lowering the pKa of the at least one functional group, regardless of which tautomeric form it is in. For example, the at least one functional group can be a nitrosophenolic group, such as a group having the formula —$C_6H_3$(OH)(NO) or a group having the formula —$C_6H_2Z$(OH)(NO), wherein Z is an electron withdrawing group such as chloro or nitro.

In one embodiment, the at least one functional group comprises an azoarene group. For example, the at least one functional group may comprise a group having the formula $Ar^1$—N=N—$Ar^2$, wherein $Ar^1$ and $Ar^2$, which can be the same or different, are an arylene group, such as a phenylene or a naphthylene group, or an aryl group, such as a phenyl group or a naphthyl group, and at least one of $Ar^1$ or $Ar^2$ is an arylene group. For this embodiment, the azoarene group has at least one or at least two OH groups, at least one or at least two $NH_2$ groups, or at least one OH group and at least one $NH_2$ group. Thus, for example, the azoarene group may have the formula —(HO)$Ar^1$—N=N—$Ar^2$(OH) (a bis-hydroxy azoarene group), —($H_2$N)$Ar^1$—N=N—$Ar^2$($NH_2$) (a bis-amino azoarene group), or —(HO)$Ar^1$—N=N—$Ar^2$($NH_2$) or —($H_2$N)$Ar^1$—N=N—$Ar^2$(OH) (an amino-hydroxy azoarene group). Other combinations may also be possible. In one embodiment, the OH and/or $NH_2$ groups are located at positions ortho to the azo group (the N=N group). For example, the at least one functional group may be a group having the structure —(HO)$C_6H_3$—N=N—$C_6H_3$(OH). Also, electron withdrawing groups, such as chloro or nitro groups, may be included on the aryl and/or arylene groups. For example, the at least one functional group is a group having the structure —(HO)$C_6H_3$—N=N—$C_6H_3Z$(OH), wherein Z is an electron withdrawing group such as chloro or nitro.

In one embodiment, the at least one functional group is selected from one or more of:
  at least one phosphonic acid group (e.g., at least two phosphonic acid groups), partial esters thereof, and salts thereof, such as a germinal bisphosphonic acid group, partial esters thereof, and salts thereof;
  at least one heterocyclic group having at least one OH group (e.g., at least two OH groups) and salts thereof;
  at least one phosphonic acid group or a salt thereof and at least one second ionic, ionizable, or basic group vicinal or geminal to the phosphonic acid group, and salts thereof;
  an aryl or alkyl polyacid group having at least three carboxylic acids.
  a heteroaryl group having at least one carboxylic acid group, and salts thereof;
  an aryl group having at least one nitroso group and at least one OH group, and salts thereof; and
  an azoarene group having at least one OH group, at least one $NH_2$ group, or at least one OH group and at least one $NH_2$ group and has the formula $Ar^1$—N=N—$Ar^2$, wherein $Ar^1$ and $Ar^2$, which can be the same or different, are an arylene group or an aryl group and at least one of $Ar^1$ or $Ar^2$ is an arylene group.

Pigments

In one embodiment, the inkjet ink composition comprises at least one pigment, which can be unmodified or modified. The pigments are solid materials generally in the form of a particulate or in a form readily formed into a particulate, such as a pressed cake. In one embodiment, the modified pigment has attached at least one moiety, e.g., acid groups (and partial salts, partial esters, salts, and esters thereof), and organic groups. In another embodiment, the modified pigment is an oxidized pigment, which can further comprise attached moieties. In one embodiment, the modified pigment is self-dispersible such that an external dispersant is not required for dispersing the pigment (self-dispersed pigments).

In one embodiment where the pigment is unmodified, the polymer comprising the repeat units (A), (B), and (C) can further function as a dispersant. In one embodiment where the pigment is modified, the polymer can further function as an additive. In either embodiment, the polymer can improve one or more printing performance properties, such as O.D., mottle, and durability.

The unmodified pigment can be any type of pigment conventionally used by those skilled in the art, such as black pigments and other colored pigments including blue, black, brown, cyan, green, white, violet, magenta, red, orange, or yellow pigments. Mixtures of different pigments can also be used. Representative examples of black pigments include various carbon blacks (Pigment Black 7) such as channel blacks, furnace blacks, gas blacks, and lamp blacks, and include, for example, carbon blacks sold as Regal®, Black Pearls®, Elftex®, Monarch®, Mogul®, and Vulcan® carbon blacks available from Cabot Corporation (such as Black Pearls® 2000, Black Pearls® 1400, Black Pearls® 1300, Black Pearls® 1100, Black Pearls® 1000, Black Pearls® 900, Black Pearls® 880, Black Pearls® 800, Black Pearls® 700, Black Pearls® 570, Black Pearls® L, Elftex® 8, Monarch® 1400, Monarch® 1300, Monarch® 1100, Monarch® 1000, Monarch® 900, Monarch® 880, Monarch® 800, Monarch® 700, Regal® 660, Mogul® L, Regal® 330, Regal® 400, Vulcan® P). Carbon blacks available from other suppliers can be used. Suitable classes of colored pigments include, for example, anthraquinones, phthalocyanine blues, phthalocyanine greens, diazos, monoazos, pyranthrones, perylenes, heterocyclic yellows, quinacridones, quinolonoquinolones, and (thio)indigoids. Such pigments are commercially available in either powder or press cake form from a number of sources including, BASF Corporation, Engelhard Corporation, Sun Chemical Corporation, Clariant, and Dianippon Ink and Chemicals (DIC). Examples of other suitable colored pigments are described in the Colour Index, 3rd edition (The Society of Dyers and Colourists, 1982). In one embodiment, the pigment is a cyan pigment, such as Pigment Blue 15, Pigment Blue 15:3, Pigment Blue 15:4, or Pigment Blue 60, a magenta pigment, such as Pigment Red 122, Pigment Red 177, Pigment Red 185, Pigment Red 202, or Pigment Violet 19, a yellow pigment, such as Pigment Yellow 74, Pigment Yellow 128, Pigment Yellow 139, Pigment Yellow 155, Pigment Yellow 180, Pigment Yellow 185, Pigment Yellow 218, Pigment Yellow 220, or Pigment Yellow 221, an orange pigment, such as Pigment Orange 168, a green pigment, such as Pigment Green 7 or Pigment Green 36, or black pigment, such as carbon black.

In one embodiment, the self-dispersed pigment is an oxidized carbon black. In one embodiment, "oxidized carbon blacks" are carbon black pigments generally having a pH<7.0 that feature surface-bound ionic or ionizable groups such as one or more of alcohols (phenols, naphthols), lactones, carbonyls, carboxyls (e.g., carboxylic acids), anhydrides, ethers, and quinones. The extent of oxidation of carbon black can determine the surface concentration of these groups. In one embodiment, the oxidized carbon black is obtained by oxidizing an unmodified carbon black, e.g., pigments selected from channel blacks, furnace blacks, gas blacks, and lamp blacks. Exemplary unmodified carbon blacks include those commercially available from Cabot Corporation as Regal®, Black Pearls®, Elftex®, Monarch®, Mogul®, and Vulcan®, such as Black Pearls® 1100, Black Pearls® 900, Black Pearls® 880, Black Pearls® 800, Black Pearls® 700, Black Pearls® 570, Elftex® 8, Monarch® 900, Monarch® 880, Monarch® 800, Monarch® 700, Regal® 660, and Regal® 330. Exemplary oxidizing agents for carbon blacks include oxygen gas, ozone, peroxides such as hydrogen peroxide, persulfates such as sodium and potassium persulfate, hypohalites such as sodium hypochlorite, nitric acid, and transition metal-containing oxidants such as permanganate salts, osmium tetroxide, chromium oxides, ceric ammonium nitrates, and mixtures thereof (e.g., mixtures of gaseous oxidants such as oxygen and ozone).

In another embodiment, the oxidized carbon black is obtained from commercial sources, such as Black Pearls® 1400, Black Pearls® 1300, Black Pearls® 1000, Black Pearls® L, Monarch® 1000, Mogul® L, and Regal® 400, available commercially from Cabot Corporation.

In one embodiment, the pigment has attached at least one organic group where an "attached" organic group can be distinguished from an adsorbed group in that a soxhlet extraction for several hours (e.g., at least 4, 6, 8, 12, or 24 hours) will not remove the attached group from the pigment. In another embodiment, the organic group is attached to the pigment if the organic group cannot be removed after repeated washing with a solvent or solvent mixture that can dissolve the starting organic treating material but cannot disperse the treated pigment. In yet another embodiment, "attached" refers to a bond such as a covalent bond, e.g., a pigment bonded or covalently bonded to a nucleophile or organic group.

The arylene, heteroarylene, and alkylene can be unsubstituted or substituted. Exemplary arylenes include phenylene, naphthylene, and biphenylene, and exemplary heteroarylenes include phenylene, naphthylene, and biphenylene having a ring carbon substituted with one or more oxygen or nitrogen atoms. In one embodiment, the arylene is a $C_5$-$C_{20}$ arylene. Heteroarylenes can be an arylene as defined herein which one or more ring carbon atoms is replaced with a heteroatom, e.g., N, O, and S. The heteroatom can be bonded to other groups in addition to being a ring atom. Alkylenes may be branched or unbranched. The alkylene may be a $C_1$-$C_{12}$ alkylene such as methylene, ethylene, propylene, or butylene.

In one embodiment, the pigment (carbon black or colored pigment) is modified with at least one organic group via a diazonium treatment as detailed, for instance, in the following patents: U.S. Pat. Nos. 5,554,739; 5,630,868; 5,672,198; 5,707,432; 5,851,280; 5,885,335; 5,895,522; 5,900,029; 5,922,118; 6,042,643; 6,506,245, 6,534,569; 6,641,653, 7,223,302, 6,398,858 and 6,494,943 (high shear conditions) U.S. Pat. Nos. 6,372,820; 6,368,239; 6,350,519; 6,337,358; 6,103,380; 7,173,078; 7,056,962; 6,942,724; 6,929,889; 6,911,073; 6,478,863; 6,472,471; WO 2011/143533; and U.S. Pat. No. 8,858,695, the disclosures of which are incorporated herein by reference. In one embodiment, the attachment is provided via a diazonium reaction where the at least one organic group has a diazonium salt substituent. In another embodiment, the direct attachment can be formed by using the diazonium and stable free radical methods described, for instance, in U.S. Pat. Nos. 6,068,688; 6,337, 358; 6,368,239; 6,551,393; 6,852,158, the disclosures of which are incorporated herein by reference, which makes use of reacting at least one radical with at least one particle, wherein a radical is generated from the interaction of at least one transition metal compound with at least one organohalide compound in the presence of one or more particles capable of radical capture, and the like. In yet another embodiment, the pigment (carbon black or colored pigment) can be modified (e.g., to attach functional groups) by using the methods of U.S. Pat. Nos. 5,837,045, 6,660,075 and WO 2009/048564 (reaction with organic compounds containing a C—C double bond or triple bond activated by at least one substituent) or U.S. Pub. No. 2004/0171725, U.S. Pat. Nos. 6,664,312, 6,831,194 (reaction with anhydride component), U.S. Pat. No. 6,936,097, U.S. Pub. Nos. 2001/0036994, 2003/0101901 (reaction with organic groups having —N=N—N— group), Canadian Patent No. 2,351,162, European Patent No. 1 394 221, and PCT Publication Nos. WO 01/51566 (reaction between at least one electrophile and at least one nucleophile), WO 04/63289, WO 2010/141071 (reaction with H2N-A-Y where A is a heteroatom), and WO 99/23174, the disclosures of which are incorporated herein by reference.

In one embodiment, the dispersion can be formulated to provide an amount of pigment such that the final amount in the inkjet ink composition is effective to provide the desired image quality (for example, optical density) without detrimentally affecting the performance of the inkjet ink. In one embodiment, the colorant (e.g., a pigment) is present in an amount ranging from 1% to 10% by weight, relative to the total weight of the composition, e.g., an amount ranging from 2% to 10% by weight, from 3% to 10% by weight, from 2% to 7% by weight, or from 3% to 7% by weight, relative to the total weight of the composition.

Another embodiment provides a modified pigment comprising a pigment having attached any of the amphoteric polymers disclosed herein. Attachment can be performed according to the methods disclosed herein and, e.g., via a secondary reaction with an electrophilic pigment as disclosed in U.S. Pat. Nos. 6,723,783 and 8,858,695, the disclosures of which are incorporated herein by reference. In one embodiment, the modified pigment comprises the reaction product of at least one organic group attached to the pigment (e.g., an aromatic group) with the amphoteric polymer disclosed herein comprising at least one endcapping group comprising at least one nucleophile organic group. In one embodiment, the nucleophile organic group is selected from amines and hydroxyls, e.g., amphoteric polymers comprising at least one endcapping group selected from amines and hydroxyls, as disclosed herein. In another embodiment, the modified pigment is the reaction product of aminophenyl-(2-sulfoethyl)-sulphone (APSES) with the amphoteric polymer comprising the at least one nucleophile organic group, wherein phenyl-(2-sulfoethyl)-sulphone is attached to the pigment.

Dispersions and Inkjet Ink Compositions

In one embodiment, the dispersion is an aqueous dispersion such as an inkjet ink composition, e.g., comprising a liquid vehicle. In one embodiment, the dispersion or inkjet ink composition comprises at least 50% water.

In one embodiment, the dispersion or inkjet ink composition comprises at least one organic solvent present in an amount ranging from 1% to 50%, or other amounts as disclosed herein. In one embodiment, the organic solvent is soluble or miscible in water. In another embodiment, the organic solvent is chemically stable to aqueous hydrolysis conditions (e.g., reaction with water under heat aging conditions, including, for example, the hydrolysis of esters and lactones). In one embodiment, the organic solvent has a dielectric constant below that of water, such as a dielectric constant ranging from about 10 to about 78 at 20° C. Examples of suitable organic solvents include low molecular-weight glycols (such as ethylene glycol, diethylene glycol, triethylene glycol, tetraethylene glycol, dipropylene glycol, ethylene glycol monomethyl ether, ethylene glycol monoethyl ether, triethylene glycol monomethyl or monoethyl ether, diethylene glycol monomethyl ether, diethylene glycol monoethyl ether, diethylene glycol monobutyl ether, and tetraethylene glycol monobutyl ether); alcohols (such as ethanol, propanol, iso-propyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol); diols containing from about 2 to about 40 carbon atoms (such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, and poly (ethylene-co-propylene) glycol, as well as their reaction products with alkylene oxides, including ethylene oxides, including ethylene oxide and propylene oxide); triols containing from about 3 to about 40 carbon atoms (such as glycerine (glycerol), trimethylolethane, trimethylolpropane, 1,3,5-pentanetriol, 1,2,6-hexanetriol, and the like as well as their reaction products with alkylene oxides, including ethylene oxide, propylene oxide, and mixtures thereof); polyols (such as pentaerythritol); amides (such as dimethyl formaldehyde and dimethyl acetamide); ketones or ketoalcohols (such as acetone and diacetone alcohol); ethers (such as tetrahydrofuran and dioxane); lactams (such as 2-pyrrolidone, N-methyl-2-pyrrolidone, and ε-caprolactam); ureas or urea derivatives (such as di-(2-hydroxyethyl)-5,5-dimethyl hydantoin (dantacol) and 1,3-dimethyl-2-imidazolidinone); inner salts (such as betaine); and hydroxyamide derivatives (such as acetylethanolamine, acetylpropanolamine, propylcarboxyethanolamine, and propylcarboxy propanolamine, as well as their reaction products with alkylene oxides). Additional examples include saccharides (such as maltitol, sorbitol, gluconolactone and maltose); sulfoxide derivatives (symmetric and asymmetric) containing from about 2 to about 40 carbon atoms (such as dimethylsulfoxide, methylethylsulfoxide, and alkylphenyl sulfoxides); and sulfone derivatives (symmetric and asymmetric) containing from about 2 to about 40 carbon atoms (such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, and dimethylsulfolane). The organic solvent can comprise mixtures of organic solvents.

The amount of the solvent can be varied depending on a variety of factors, including the properties of the solvent (solubility and/or dielectric constant), the type of colorant, and the desired performance of the resulting inkjet ink composition. The solvent may be used in amounts ranging from 1% to 40% by weight based on the total weight of the inkjet ink composition, including amounts ranging from 1% to 30%, or amounts ranging from 1% to 20%. In another embodiment, the amount of the solvent is greater than or equal to about 2% by weight based on the total weight of the aqueous dispersion or inkjet ink composition, including greater than or equal to about 5% and greater than or equal to about 10% by weight.

In one embodiment, an ink composition (e.g., an inkjet ink composition) comprises the amphoteric polymers disclosed herein in an amount ranging from 0.1% to 20% by weight relative to the total weight of the composition, e.g., an amount ranging from 0.1% to 10%, from 0.1% to 5%, from 0.2% to 20%, from 0.2% to 10%, from 0.2% to 5%, from 0.5% to 20%, from 0.5% to 10%, or from 0.5% to 5% by weight relative to the total weight of the composition.

In one embodiment, an ink composition (e.g., an inkjet ink composition) comprises at least one surfactant, e.g., when the pigment is not self-dispersible. The at least one surfactant can enhance the colloidal stability of the composition or change the interaction of the ink with either the printing substrate, such as printing paper, or with the ink printhead. Various anionic, cationic and nonionic dispersing agents can be used in conjunction with the ink composition of the present invention, and these may be used neat or as a water solution. In one embodiment, the surfactant is present in an amount ranging from 0.05% to 5%, e.g., an amount ranging from 0.1% to 5%, or from 0.5% to 2%, by weight relative to the total weight of the inkjet ink composition.

Representative examples of anionic dispersants or surfactants include, but are not limited to, higher fatty acid salts, higher alkyldicarboxylates, sulfuric acid ester salts of higher alcohols, higher alkyl-sulfonates, alkylbenzenesulfonates, alkylnaphthalene sulfonates, naphthalene sulfonates (Na, K, Li, Ca, etc.), formalin polycondensates, condensates between higher fatty acids and amino acids, dialkylsulfosuccinic acid ester salts, alkylsulfosuccinates, naphthenates, alkylether carboxylates, acylated peptides, α-olefin sulfonates, N-acrylmethyl taurine, alkylether sulfonates, secondary higher alcohol ethoxysulfates, polyoxyethylene alkylphenylether sulfates, monoglycylsulfates, alkylether phosphates and alkyl phosphates, alkyl phosphonates and bisphosphonates, included hydroxylated or aminated derivatives. For example, polymers and copolymers of styrene sulfonate salts, unsubstituted and substituted naphthalene sulfonate salts (e.g. alkyl or alkoxy substituted naphthalene derivatives), aldehyde derivatives (such as unsubstituted alkyl aldehyde derivatives including formaldehyde, acetaldehyde, propylaldehyde, and the like), maleic acid salts, and mixtures thereof may be used as the anionic dispersing aids. Salts include, for example, $Na^+$, $Li^+$, $K^+$, $Cs^+$, $Rb^+$, and substituted and unsubstituted ammonium cations. Representative examples of cationic surfactants include aliphatic amines, quaternary ammonium salts, sulfonium salts, phosphonium salts and the like.

Representative examples of nonionic dispersants or surfactants that can be used in ink jet inks of the present invention include fluorine derivatives, silicone derivatives, acrylic acid copolymers, polyoxyethylene alkyl ether, polyoxyethylene alkylphenyl ether, polyoxyethylene secondary alcohol ether, polyoxyethylene styrol ether, ethoxylated acetylenic diols, polyoxyethylene lanolin derivatives, ethylene oxide derivatives of alkylphenol formalin condensates, polyoxyethylene polyoxypropylene block polymers, fatty acid esters of polyoxyethylene polyoxypropylene alkylether polyoxyethylene compounds, ethylene glycol fatty acid esters of polyethylene oxide condensation type, fatty acid monoglycerides, fatty acid esters of polyglycerol, fatty acid esters of propylene glycol, cane sugar fatty acid esters, fatty acid alkanol amides, polyoxyethylene fatty acid amides and polyoxyethylene alkylamine oxides. For example, ethoxylated monoalkyl or dialkyl phenols may be used. These nonionic surfactants or dispersants can be used alone or in combination with the aforementioned anionic and cationic dispersants.

In one embodiment, the inkjet ink composition comprises the amphoteric polymer disclosed herein as a first polymer and further comprises a second polymer that is a polymeric dispersant, e.g., a natural polymer or a synthetic polymer dispersant. Specific examples of natural polymer dispersants include proteins such as glue, gelatin, casein and albumin; natural rubbers such as gum arabic and tragacanth gum; glucosides such as saponin; alginic acid, and alginic acid derivatives such as propyleneglycol alginate, triethanolamine alginate, and ammonium alginate; and cellulose derivatives such as methyl cellulose, carboxymethyl cellulose, hydroxyethyl cellulose and ethylhydroxy cellulose. Specific examples of polymeric dispersants, including synthetic polymeric dispersants, include polyvinyl alcohols, polyvinylpyrrolidones, acrylic or methacrylic resins (often written as "(meth)acrylic") such as poly(meth)acrylic acid, acrylic acid-(meth)acrylonitrile copolymers, potassium (meth)acrylate-(meth)acrylonitrile copolymers, vinyl acetate-(meth)acrylate ester copolymers and (meth)acrylic acid-(meth)acrylate ester copolymers; styrene-acrylic or methacrylic resins such as styrene-(meth)acrylic acid copolymers, styrene-(meth)acrylic acid-(meth)acrylate ester copolymers, styrene-α-methylstyrene-(meth)acrylic acid copolymers, styrene-α-methylstyrene-(meth)acrylic acid-(meth)acrylate ester copolymers; styrene-maleic acid copolymers; styrene-maleic anhydride copolymers, vinyl naphthalene-acrylic or methacrylic acid copolymers; vinyl naphthalene-maleic acid copolymers; and vinyl acetate copolymers such as vinyl acetate-ethylene copolymer, vinyl acetate-fatty acid vinyl ethylene copolymers, vinyl acetate-maleate ester copolymers, vinyl acetate-crotonic acid copolymer and vinyl acetate-acrylic acid copolymer; and salts thereof.

In one embodiment, the polymeric dispersant is adsorbed to the pigment. In another embodiment, the polymeric dispersant encapsulates the pigment (e.g., a polymer-encapsulated pigment). Polymer-dispersed pigments can comprise natural polymer or a synthetic polymer dispersants as described herein. The pigment can be any pigment described herein, e.g., a non-modified, or otherwise untreated pigment, or a modified (self-dispersed) pigment. In one embodiment, the polymeric dispersant is present in an amount ranging from 0.1% to 20% by weight, e.g., from 0.2% to 20% by weight, or from 0.5% to 20% by weight relative to the total weight of the inkjet ink composition.

In one embodiment, polymer-encapsulated pigments comprise polymers crosslinked with various crosslinking agents. In one embodiment, the polymer encapsulating the pigment comprises the polymeric dispersant as disclosed herein. In another embodiment, the polymer encapsulating the pigment comprises the amphoteric polymers disclosed herein. In one embodiment, the cross-linking agents are selected from tri-epoxy-based compounds, such as trimethylolpropane polyglycidyl ether.

Polymeric binders can also be used in conjunction with the inkjet ink composition of the present invention to adjust the viscosity of the composition as well as to provide other desirable properties. Suitable polymeric binders include, but are not limited to, water soluble polymers and copolymers such as gum arabic, polyacrylate salts, polymethacrylate salts, polyvinyl alcohols (Elvanol® polyvinyl alcohol from DuPont, Selvol™ from Sekisui Specialty Chemicals), hydroxypropylenecellulose, hydroxyethylcellulose, polyvinylpyrrolidinone (such as Luvitec® polyvinylpyrrolidinone and Kollidon® polyvinylpyrrolidinone from BASF), polyvinylether, starch, polysaccharides, polyethyleneimines with or without being derivatized with ethylene oxide and propylene oxide; the Jeffamine® polyetheramines (Huntsman); and the like. Additional examples of water-soluble polymer compounds include various dispersants or surfactants described above, including, for example, styrene-acrylic acid copolymers (such as Joncryl® resins from BASF), styrene-acrylic acid-alkyl acrylate terpolymers, styrene-methacrylic acid copolymers (such as Joncryl® resins from BASF), styrene-maleic acid copolymers (such as the SMA® resins from Cray Valley), styrene-maleic acid-alkyl acrylate terpolymers, styrene-methacrylic acid-alkyl acrylate terpolymers, styrene-maleic acid half ester copolymers, vinyl naphthalene-acrylic acid copolymers, alginic acid, polyacrylic acids or their salts and their derivatives. In addition, the binder may be added or present in dispersion or latex form. For example, the polymeric binder may be a latex of acrylate or methacrylate copolymers (such as NeoCryl® resins from Koninklijke DSM N.V., the AC and AS polymers from Alberdingk-Boley) or may be a water dispersible polyurethane (such as ABU polymers from Alberdingk-Boley) or polyester (such as Eastman AQ™ polymers from Eastman Chemical). Polymers, such as those listed above, variations and related materials, that can be used for binders in inkjet inks are included in the Ethacryl® dispersants from Lyondell Chemical Company, the Joncryl® resins from BASF, the NeoCryl® resins from Koninklijke DSM N.V., and the AC and AS polymers Alberdingk-Boley.

In one embodiment, in addition to the surfactant, the inkjet ink compositions can further comprise one or more suitable additives to impart a number of desired properties while maintaining the stability of the compositions. Other additives are well known in the art and include humectants, biocides and fungicides, binders such as polymeric binders, pH control agents, drying accelerators, penetrants, and the like. The amount of a particular additive will vary depending on a variety of factors but are generally present in an amount ranging between 0.01% and 40% based on the weight of the inkjet ink composition. In one embodiment, the at least one additive is present in an amount ranging from 0.05% to 5%, e.g., an amount ranging from 0.1% to 5%, or an amount ranging from 0.5% to 2%, by weight relative to the total weight of the inkjet ink composition Humectants and water soluble organic compounds other than the at least one organic solvent may also be added to the inkjet ink composition of the present invention, e.g., for the purpose of preventing clogging of the nozzle as well as for providing paper penetration (penetrants), improved drying (drying accelerators), and anti-cockling properties. In one embodiment, the humectant and/or water soluble compound is present in an amount ranging from 0.1% to 10%, e.g., an amount ranging from 1% to 10%, or an amount ranging from 0.1% to 5%, or from 1% to 5%.

Specific examples of humectants and other water soluble compounds that may be used include low molecular-weight glycols such as ethylene glycol, diethylene glycol, triethylene glycol, tetraethylene glycol and dipropylene glycol; diols containing from about 2 to about 40 carbon atoms, such as 1,3-pentanediol, 1,4-butanediol, 1,5-pentanediol, 1,4-pentanediol, 1,6-hexanediol, 1,5-hexanediol, 2,6-hexanediol, neopentylglycol (2,2-dimethyl-1,3-propanediol), 1,3-propanediol, 1,4-butanediol, 1,5-pentanediol, 1,6-hexanediol, 1,2,6-hexanetriol, poly(ethylene-co-propylene) glycol, and the like, as well as their reaction products with alkylene oxides, including ethylene oxides, including ethylene oxide and propylene oxide; triol derivatives containing from about 3 to about 40 carbon atoms, including glycerine, trimethylolpropane, 1,3,5-pentanetriol, 1,2,6-hexanetriol, and the like as well as their reaction products with alkylene oxides, including ethylene oxide, propylene oxide, and mixtures thereof; neopentylglycol, (2,2-dimethyl-1,3-propanediol), and the like, as well as their reaction products with alkylene oxides, including ethylene oxide and propylene oxide in any desirable molar ratio to form materials with a wide range of molecular weights; thiodiglycol; pentaerythritol and lower alcohols such as ethanol, propanol, isopropyl alcohol, n-butyl alcohol, sec-butyl alcohol, and tert-butyl alcohol, 2-propyn-1-ol (propargyl alcohol), 2-buten-1-ol, 3-buten-2-ol, 3-butyn-2-ol, and cyclopropanol; amides such as dimethyl formaldehyde and dimethyl acetamide; ketones or ketoalcohols such as acetone and diacetone alcohol; ethers such as tetrahydrofuran and dioxane; cellosolves such as ethylene glycol monomethyl ether and ethylene glycol monoethyl ether, triethylene glycol monomethyl (or monoethyl) ether; carbitols such as diethylene glycol monomethyl ether, diethylene glycol monoethyl ether, and diethylene glycol monobutyl ether; lactams such as 2-pyrrolidone, N-methyl-2-pyrrolidone and ε-caprolactam; urea and urea derivatives; inner salts such as betaine, and the like; thio (sulfur) derivatives of the aforementioned materials including 1-butanethiol; t-butanethiol 1-methyl-1-propanethiol, 2-methyl-1-propanethiol; 2-methyl-2-propanethiol; thiocyclopropanol, thioethyleneglycol, thiodiethyleneglycol, trithio- or dithio-diethyleneglycol, and the like; hydroxyamide derivatives, including acetylethanolamine, acetylpropanolamine, propylcarboxyethanolamine, propylcarboxy propanolamine, and the like; reaction products of the aforementioned materials with alkylene oxides; and mixtures thereof. Additional examples include saccharides such as maltitol, sorbitol, gluconolactone and maltose; polyhydric alcohols such as trimethylol propane and trimethylol ethane; N-methyl-2-pyrrolidone; 1,3-dimethyl-2-imidazolidinone; sulfoxide derivatives containing from about 2 to about 40 carbon atoms, including dialkylsulfides (symmetric and asymmetric sulfoxides) such as dimethylsulfoxide, methylethylsulfoxide, alkylphenyl sulfoxides, and the like; and sulfone derivatives (symmetric and asymmetric sulfones) containing from about 2 to about 40 carbon atoms, such as dimethylsulfone, methylethylsulfone, sulfolane (tetramethylenesulfone, a cyclic sulfone), dialkyl sulfones, alkyl phenyl sulfones, dimethylsulfone, methylethylsulfone, diethylsulfone, ethylpropylsulfone, methylphenylsulfone, methylsulfolane, dimethylsulfolane, and the like. Such materials may be used alone or in combination.

Biocides and/or fungicides may also be added to the aqueous dispersions or inkjet ink composition disclosed herein. Biocides are important in preventing bacterial growth since bacteria are often larger than ink nozzles and can cause clogging as well as other printing problems. Examples of useful biocides include, but are not limited to, benzoate or sorbate salts, and isothiazolinones. In one embodiment, the biocides and/or fungicides are present in an amount ranging from 0.05% to 5% by weight, 0.05% to 2% by weight, 0.1% to 5% by weight, or 0.1% to 2% by weight, relative to the total weight of the composition.

In one embodiment, the polymer consists essentially of, or consists of repeat units (A), (B), (C), (D), $X_1$ and $X_2$.

EXAMPLES

Definitions and Abbreviations

NaAL=sodium alendronate.
NaOH=sodium hydroxide.
PPG-DGE=a polypropylene glycol diglycidyl ether with varied average molecular weights from ca. 380 g/mol to ca. 900 g/mol.
BPA-DGE=bisphenol A diglycidyl ether.
AP=3-aminopropyl alcohol.
BA=n-butylamine.
HA=n-hexylamine.
BzA=benzylamine.
PiP=piperazine.
AA=dimethylaminoethylamine.
IPA=2-propanol.
Acid ion-exchange resin=Purolite® C107E ion-exchange resin.
TEA/Acetate=a salt from mixing triethanolamine and acetic acid (80/20 molar ratio).
SURFYNOL 465=SURFYNOL® 465 surfactant, a non-ionic surfactant from Air Products.
TEGMBE=triethylene glycol monobutyl ether.
Acid number (AN) is calculated by using the amounts of acid-containing monomer based on the following equation: AN=moles of acid-containing monomer×56.1 mgKOH/mol×n×1000/(the total mass (g) of polymer sample), where number of moles of ionizable protons per moles of acid-containing monomer. When the acid-containing monomer is NaAL, n=4, and when the acid-containing monomer contains one carboxylic acid group or one sulfonic group, n=1.

Amine number (AmineNum) is calculated by using the amounts of amino-containing monomer based on the following equation: AmineNum=moles of amino-containing monomer×56.1 mg KOH/mol×n×1000/(the total mass (g) of polymer sample), where n=number of moles of basic nitrogens per moles of amino-containing monomer. When the amino-containing monomer is sodium alendronate ("NaAL"), 3-aminopropyl alcohol ("AP"), n-butylamine ("BA"), n-hexylamine ("HA"), or benzylamine ("BzA"), n=1, and when the amino-containing monomer is piperazine ("PiP") or dimethylaminoethylamine ("AA"), n=2.

Polymer Examples

The Polymer-A to Polymer-K Examples describe the synthesis of a polymer having both cationic and anionic groups, where the anionic functional groups have a calcium index value greater than a calcium binding index value of phenylphosphonic acid. The general reaction scheme is shown below, where (A) and (B) groups are altered for each of Polymer-A to Polymer-K:

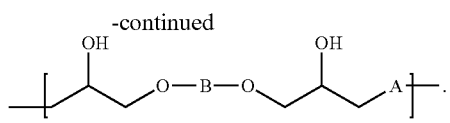

Table 1 lists the reagents used and the reaction conditions for Poly-A to Poly-K, and the physical properties of the final polymer.

Polymer-A

A NaAL solution was prepared by dissolving sodium alendronate trihydrate (7.68 parts) in 142 ml of 0.5 M NaOH. To this stirred mixture was added PPG-DGE (19.05 parts, Mn 600 g/mol), followed by 70 ml of 2-propanol ("IPA"). The resultant mixture was heated at 80° C. for 24 h. During this time, the initial hazy mixture became clear and homogeneous. After cooling to room temperature, the solution was transferred to an evaporation flask and the reaction flask further rinsed with DI water and also added to the evaporation flask. Volatiles were removed in vacuo at 40° C./40 torr until IPA was effectively removed. The pH was adjusted by stirring the solution at 40-50° C. in the presence of an acid resin from an initial value of 11-12 until the pH was 9.5-9.7. Suction filtration through a glass frit to remove the ion exchange beads afforded a clear, colorless liquid. $^1$H NMR was used to determine its number average molecular weight. Final physical properties are listed in Table 1.

Polymer-B

This Example describes the synthesis of a polymer ("Polymer-B") similar to that of Polymer-A except a second type of (B) group is introduced via BPA-DGE. A solution of PPG-DGE (5.36 parts, Mn 380 g/mol) and BPA-DGE (1.2 parts, Mn 340 g/mol) was heated at 60° C. in 55 ml of 2-propanol ("IPA"). This warm solution was added rapidly to a stirred solution of sodium alendronate trihydrate (5.17 parts) in 95 ml of 0.5M NaOH, also at 50-60° C. The initially hazy solution was heated at 80° C. for 24 hours, during which time the mixture became clear. After cooling to room temperature, the solution was transferred to an evaporation flask and the reaction flask further rinsed with DI water and also added to the evaporation flask. Volatiles were removed in vacuo at 40° C./40 torr until 2-propanol was effectively removed. The pH was adjusted by stirring the solution at 40-50° C. in the presence of an acid resin from an initial value of 11-12 until the pH was 9.5-9.7. Suction filtration through a glass frit to remove the ion exchange beads afforded a clear, colorless liquid. Final physical properties listed in Table 1.

Polymer-C

This Example describes the synthesis of a polymer ("Polymer-C") similar to that of Polymer-A except a second amine group is introduced via 3-aminopropyl alcohol ("AP"). Polymer-C was prepared according to the procedure described in Polymer-A, with specific reaction conditions and final physical properties listed in Table 1.

Polymer-D

This Example describes the synthesis of a polymer ("Polymer-D") similar to that of Polymer-C except the percentage of second amine, 3-aminopropyl alcohol, is increased. Polymer-D was prepared according to the procedure described in Polymer-A, with specific reaction conditions and final physical properties listed in Table 1.

Polymer-E

This Example describes the synthesis of a polymer ("Polymer-E") similar to that of Polymer-A except the Mn of PPG is different. Polymer-E was prepared according to the procedure described in Polymer-A, with specific reaction conditions and final physical properties listed in Table 1.

Polymer-F

This Example describes the synthesis of a polymer ("Polymer-F") similar to that of Polymer-A except the Mn of PPG is different. Polymer-F was prepared according to the procedure described in Polymer-A, with specific reaction conditions and final physical properties listed in Table 1.

Polymer-G

This Example describes the synthesis of a polymer ("Polymer-G") similar to that of Polymer-A except a second amine group is introduced via dimethylaminoethylamine ("AA"). Polymer-G was prepared according to the procedure described in Polymer-A, with specific reaction conditions and final physical properties listed in Table 1.

Polymer-H

This Example describes the synthesis of a polymer ("Polymer-H") similar to that of Polymer-A except a second amine group is introduced via piperazine ("PiP"). Polymer-H, was prepared according to the procedure described in Polymer-A, with specific reaction conditions and final physical properties listed in Table 1. The repeat units of Polymer-H include the structures:

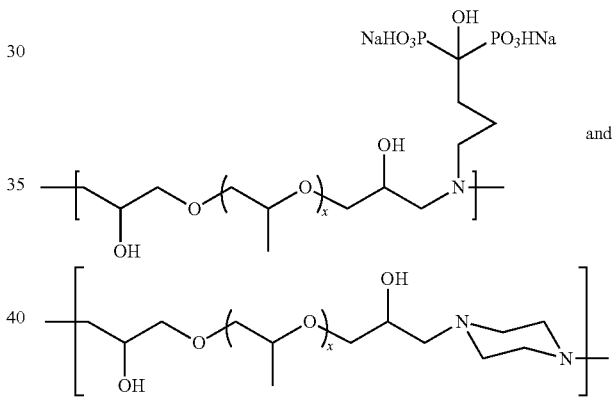

Polymer-I

This Example describes the synthesis of a polymer ("Polymer-I") similar to that of Polymer-A except a second amine group is introduced via n-butylamine ("BA"). Polymer-I was prepared according to the procedure described in Polymer-A, with specific reaction conditions and final physical properties listed in Table 1.

Polymer-J

This Example describes the synthesis of a polymer ("Polymer-J") similar to that of Polymer-A except a second amine group is introduced via HA. Polymer-J was prepared according to the procedure described in Polymer-A, with specific reaction conditions and final physical properties listed in Table 1.

Polymer-K

This Example describes the synthesis of a polymer ("Polymer-K") similar to that of Polymer-A except a second amine group is introduced via BzA. Polymer-K was prepared according to the procedure described in Polymer-A, with specific reaction conditions and final physical properties listed in Table 1.

TABLE 1

| Examples | B₁ comp. | Mn | parts | B₂ comp. | Mn | parts | A comp. | parts | Add'l Amine* comp. | parts |
|---|---|---|---|---|---|---|---|---|---|---|
| Polymer-A | PPG | 600 | 19.05 | | | | NaAL | 7.68 | | |
| Polymer-B | PPG | 380 | 5.5 | BPA | 340 | 1.2 | NaAL | 5.17 | | |
| Polymer-C | PPG | 544 | 3.46 | | | | NaAL | 1.86 | AP | 0.047 |
| Polymer-D | PPG | 380 | 4.9 | | | | NaAL | 2 | AP | 0.5 |
| Polymer-E | PPG | 883 | 37.7 | | | | NaAL | 13.88 | | |
| Polymer-F | PPG | 638 | 27.8 | | | | NaAL | 14.15 | | |
| Polymer-G | PPG | 638 | 32.1 | | | | NaAL | 12 | AA | 1.62 |
| Polymer-H | PPG | 638 | 13.91 | | | | NaAL | 4.96 | PiP | 0.56 |
| Polymer-I | PPG | 883 | 12.3 | | | | NaAL | 4.07 | BA | 0.102 |
| Polymer-J | PPG | 638 | 13.4 | | | | NaAL | 4.78 | HA | 0.638 |
| Polymer-K | PPG | 638 | 8.83 | | | | NaAL | 3.15 | BzA | 0.44 |

| Examples | Reaction Conditions 0.5M NaOH (mL) | IPA (mL) | Temp. (C.) | Time (h) | Final Polymer pH | Mn (g/mol) | AN | Amine Num |
|---|---|---|---|---|---|---|---|---|
| Polymer-A | 142 | 70 | 80 | 24 | 9.7 | 7700 | 234 | 58 |
| Polymer-B | 95 | 55 | 80 | 24 | 9.5 | 14600 | 317 | 79 |
| Polymer-C | 34 | 17 | 80 | 19 | 9.8 | 5400 | 247 | 69 |
| Polymer-D | 37 | 18 | 80 | 20 | 9.4 | | 192 | 100 |
| Polymer-E | 256 | 128 | 75 | 16 | 9.7 | 11100 | 191 | 48 |
| Polymer-F | 261 | 130 | 75 | 16 | 9.7 | 9400 | 241 | 60 |
| Polymer-G | 221 | 141 | 75 | 18 | 9.5 | | 184 | 94 |
| Polymer-H | 92 | 92 | 75 | 16 | 9.7 | 7700 | 181 | 84 |
| Polymer-I | 75 | 38 | 75 | 16 | 9.7 | 10900 | 175 | 49 |
| Polymer-J | 88 | 88 | 75 | 16 | 9.6 | | 180 | 64 |
| Polymer-K | 58 | 58 | 75 | 16 | 7.0 | | 179 | 64 |

*Additional amine, unlike the repeat unit (A), does not contain a functional group having a calcium index value greater than or equal to a calcium index value for phenylphosphonic acid.

Polymer-L

Polymer-L is a commercially available styrene-acrylic resin (Joncryl® 683 resin, BASF) dissolved in basic NaOH solution. This polymer is non-amphoteric and contains carboxylic acid groups.

Polymer-M

Polymer-M is a commercially available aliphatic polyether waterborne polyurethane used as is (NeoRez™ R551 resin, DSM Coating Resins Inc.). This polymer is non-amphoteric and contains carboxylic acid groups.

Polymer-N

Polymer-N is a commercially available styrene maleic anhydride copolymer (SMA® 3000, Total Cray Valley) is dissolved in basic KOH solution. This polymer is non-amphoteric and contains carboxylic acid groups.

Polymer-O

This Example describes the preparation of a waterborne aliphatic polyether polyurethane ("Polymer-O") containing only carboxylic acid groups in the repeat unit. This polymer is non-amphoteric. Polymer-O was prepared from the chain extension of an NCO-terminated prepolymer in water, in which the prepolymer was prepared according to the procedure described in Example 1 of U.S. Pub. No. 2013/0210999, except isophorone diisocyanate was used in place of TDI. The polyurethane was prepared according to Comparative Example 1B of U.S. Pub. No. 2013/0210999. A final solution containing a polypropylene glycol-based polyurethane was obtained (20.4% solid, Mw=14,600 g/mol, AN=48).

Polymer-P

This Example describes the preparation of a waterborne aliphatic polyether polyurethane ("Polymer-P") containing carboxylic acid groups and bisphosphonate groups in the repeat unit. This polymer is non-amphoteric. Polymer-P was prepared from the chain extension of an NCO-terminated prepolymer in water, in which the prepolymer was prepared according to the procedure described in Example 1 of U.S. Pub. No. 2013/0210999, except isophorone diisocyanate was used in place of TDI. The polyurethane was prepared according to Example 1A of U.S. Pub. No. 2013/0210999. A final solution containing a polypropylene glycol-based polyurethane having bisphosphonate groups was obtained (14.3% solid, Mw=21,600 g/mol, AN=56, P wt %=0.21).

Polymer-Q

Carboxymethyl chitosan ("CC"), a carbohydrate polysaccharide chitosan derivative (BOC Sciences), is dissolved in water. The polymer sample contains both carboxylic acid and amino groups. This polymer is amphoteric but does not have a functional group having a calcium index value greater than or equal to a calcium binding index value of phenylphosphonic acid.

Polymer-R

This Example describes the preparation of an amphoteric polymer ("Polymer-R") having an amino group and a sulfonic acid group in its repeat unit. This polymer does not include a functional group having a calcium index value greater than or equal to a calcium binding index value of phenylphosphonic acid.

A taurine solution was prepared by dissolving taurine (4.0 parts) in 96 mL of 0.5M NaOH. To this stirred mixture was added PPG-DGE (22.7 parts, Mn 544 g/mol) followed by 50 mL of 2-propanol ("IPA"). The resultant mixture was heated at 75° C. for 16 h. During this time, the initial hazy mixture became clear and homogeneous. After cooling to room temperature, the solution was transferred to an evaporation flask and the reaction flask further rinsed with DI water and also added to the evaporation flask. Volatiles were removed in vacuo at 40° C./40 torr until IPA was effectively removed. The pH was adjusted by stirring the solution at 40-50° C. in the presence of an acid resin from an initial value of 12.6 until the pH was 7.8. Suction filtration through a glass frit to remove the ion exchange beads afforded a clear, colorless liquid (33.6% solid; AN=77; AmineNum=77).

Examples 1-21

Examples 1-21 describe the preparation of dispersions containing the polymers Polymer-A to Polymer-R and their relative sensitivity to $Ca^{2+}$ ions.

The pigments used in these examples are carbon black or organic pigments having attached at least one acid group or salt thereof (self-dispersed pigments), all available commercially as pigment dispersions from Cabot Corporation and sold as CAB—O-JET® dispersions ("COJ"), e.g., CAB-O-JET® 200 (carbon black dispersion), CAB-O-JET® 250C (cyan pigment dispersion), CAB-O-JET® 265M (magenta pigment dispersion), CAB-O-JET® 270Y (yellow pigment dispersion), and CAB-O-JET® 300 (carbon black dispersion) dispersions.

Table 2 lists the pigment dispersion Examples 1-21, each of which contains CAB-O-JET® 250C. Examples 1-19 contain as additives the polymers Polymer-A to Polymer-R, in respective weight percent of the final dispersion composition, with the balance being water. Example 20 contains sodium alendronate alone (no polymer), and Example 21 contains only pigment. The additive was quoted on a solid basis and the pigment dispersion was quoted on a pigment basis.

TABLE 2

| Example | Additive | Additive (wt %) | Pigment (wt %) |
| --- | --- | --- | --- |
| 1 | Polymer-A | 0.5 | 4.5 |
| 2 | Polymer-A | 1 | 4 |
| 3 | Polymer-B | 1 | 4 |
| 4 | Polymer-C | 1 | 4 |
| 5 | Polymer-D | 1 | 4 |
| 6 | Polymer-E | 1 | 4 |
| 7 | Polymer-F | 1 | 4 |
| 8 | Polymer-G | 1 | 4 |
| 9 | Polymer-H | 1 | 4 |
| 10 | Polymer-I | 1 | 4 |
| 11 | Polymer-J | 1 | 4 |
| 12 | Polymer-K | 1 | 4 |
| 13 | Polymer-L | 1 | 4 |
| 14 | Polymer-M | 1 | 4 |
| 15 | Polymer-N | 1 | 4 |
| 16 | Polymer-O | 1 | 4 |
| 17 | Polymer-P | 1 | 4 |
| 18 | Polymer-Q | 1 | 4 |
| 19 | Polymer-R | 1 | 4 |
| 20 | NaAL | 1 | 4 |
| 21 | — | — | 5 |

The calcium index of phenylphosphonic acid is 2.53, was measured by using Method A as described in U.S. Pat. No. 8,858,695, at col. 29, line 45 to col. 30, line 44, including a list of calcium index values for various compounds in Table 5A, the disclosure of which is incorporated herein by reference. Examples 1-12 contained Polymer-A to Polymer-K, each of which are amphoteric polymers having a functional group, —$CH_2CH_2CH_2C(OH)(PO_3HNa)_2$. Based on the previous measurement of $CH_2(PO_3^{2-})_2$ (Table 5A of U.S. Pat. No. 8,858,695), the calcium index value for this functional group was determined to be about 3.45. Example 17 contains Polymer-P, which is anionic and has —$CH_2CH_2CH_2C(OH)(PO_3HNa)_2$ as the functional group. Examples 13-16 and 18 contain polymers having carboxylic acids; the calcium index value of these functional groups was determined to be in the range of about 1.27-2.37, based on the previous measurements of benzoic acid and succinic acid. Example 19 contains a polymer having a sulfonic acid functional group with a calcium index value determined to be about 0.78, based on the previous measurement of toluene sulfonic acid.

Accordingly, Examples 1-12 contain amphoteric polymers with a functional groups with a calcium index value greater than a calcium binding index value of phenylphosphonic acid. Examples 13-16, 18 and 19 contained non-amphoteric polymers with a functional group having a calcium index value less than a calcium binding index value of phenylphosphonic acid. Finally, Example 17 contains an anionic polymer with a functional group having a calcium index value greater than a calcium binding index value of phenylphosphonic acid.

To take into account the ability of the polymer to bind calcium, taking into account the functional group, amphoterism, and hydrophobicity, among other factors, a calcium sensitivity test was developed. The Ca-sensitivity test was conducted by adding one drop (ca. 0.05 g) of the dispersion Examples 1-21 into a series of 25 mL $CaCl_2$ solutions with varied levels of molar concentrations: 0.50 mM, 1.0 mM, 2.5 mM, 5 mM, 10 mM, and 50 mM. Upon the addition of dispersion, the lowest molar concentration of $CaCl_2$ was recorded when the immediate precipitation of pigment dispersion was observed. After testing all these examples, their $CaCl_2$ molar concentrations, at which pigments started precipitating, were summarized in Table 3. The lower the $CaCl_2$ concentration required for precipitation, the greater the sensitivity towards calcium, which can indicate capability for calcium binding.

TABLE 3

| Example | Polymer Additive | $[CaCl_2]$, mM |
| --- | --- | --- |
| 1 | Polymer-A | 2.5 |
| 2 | Polymer-A | 2.5 |
| 3 | Polymer-B | 2.5 |
| 4 | Polymer-C | 2.5 |
| 5 | Polymer-D | 2.5 |
| 6 | Polymer-E | 1.0 |
| 7 | Polymer-F | 2.5 |
| 8 | Polymer-G | 1.0 |
| 9 | Polymer-H | 1.0 |
| 10 | Polymer-I | 2.5 |
| 11 | Polymer-J | 2.5 |
| 12 | Polymer-K | 1.0 |
| 13 | Polymer-L | 50 |
| 14 | Polymer-M | 10 |
| 15 | Polymer-N | 5 |
| 16 | Polymer-O | 10 |
| 17 | Polymer-P | 10 |
| 18 | Polymer-Q | 50 |
| 19 | Polymer-R | 50 |
| 20 | NaAL | 50 |
| 21 | — | 50 |

From Table 3, it can be seen that the highest calcium sensitivities (lowest required $CaCl_2$ concentration for precipitation) were achieved with dispersion Examples 1-12 containing polymers Polymer-A to Polymer-K, each of which are amphoteric polymers having a functional group with a calcium index value greater than a calcium binding index value of phenylphosphonic acid. This is an improvement over dispersion Examples 13-16, which contain non-amphoteric polymers that do not have a functional group with a calcium index value greater than or equal to a calcium binding index value of phenylphosphonic acid. Moreover, the calcium sensitivity of Examples 1-12 is improved over Example 17 containing non-amphoteric polymers with a functional group having a calcium index value greater than a calcium binding index value of phenylphosphonic acid. Dispersion Examples 18 and 19, which contain amphoteric polymers that do not have a functional group with a calcium index value greater than or equal to a calcium binding index value of phenylphosphonic acid performed as poorly as dispersions that contain no polymer additive (Example 21, pigment only; Example 20, pigment and NaAL only), where the bisphosphonate functional group is not part of a polymer. Examples 18-21 were not very sensitive to the presence of $Ca^{2+}$ ions as 50 mM of $CaCl_2$ was required to achieve precipitation.

Examples 22-41

Ink jet ink compositions containing polymers were prepared to assess inkjet print image quality features, such as optical density (OD), mottle, and strikethrough. Such properties can correlate with the sensitivity of pigment dispersions to polyvalent metal ions, such as $Ca^{2+}$ as most papers contain certain amount of these polyvalent metal ions. The printing performance of the inkjet ink compositions were tested on various papers.

Ink Compositions

Table 4 lists the pigments and additive components for Examples 22-41, and Table 5 lists the ink components common to each composition.

TABLE 4

| Example | Additive | Additive (wt %) | Pigment | Pigment (wt %) |
|---|---|---|---|---|
| 22 | Polymer-A | 0.21 | COJ250C | 2.1 |
| 23 | Polymer-A | 0.42 | COJ250C | 2.1 |
| 24 | Polymer-A | 1.05 | COJ250C | 2.1 |
| 25 | Polymer-L | 0.42 | COJ250C | 2.1 |
| 26 | Polymer-M | 0.42 | COJ250C | 2.1 |
| 27 | Polymer-N | 0.42 | COJ250C | 2.1 |
| 28 | Polymer-O | 0.42 | COJ250C | 2.1 |
| 29 | Polymer-P | 0.42 | COJ250C | 2.1 |
| 30 | Polymer-Q | 0.42 | COJ250C | 2.1 |
| 31 | Polymer-R | 0.42 | COJ250C | 2.1 |
| 32 | NaAL | 0.21 | COJ250C | 2.1 |
| 33 | — | 0 | COJ250C | 2.1 |
| 34 | — | 0 | COJ265M | 4.2 |
| 35 | Polymer-A | 0.84 | COJ265M | 4.2 |
| 36 | — | 0 | COJ200 | 3 |
| 37 | Polymer-A | 0.6 | COJ200 | 3 |
| 38 | — | 0 | COJ300 | 3 |
| 39 | Polymer-A | 0.6 | COJ300 | 3 |
| 40 | Polymer-L | 0.6 | COJ300 | 3 |
| 41 | Polymer-R | 0.6 | COJ300 | 3 |

TABLE 5

| Component | wt. % |
|---|---|
| Glycerol | 20% |
| Surfynol 465 | 1% |
| TEA/Acetate | 1% |
| Proxel GXL | 0.1% |
| water | balance |

Ink Evaluation

Ink Examples 22-41 were evaluated by performing a drawdown of ink (70 µL) on varied papers by using a #18 wire-wound lab rod. Inks were evaluated on Hewlett-Packard multi-purpose printing paper (HPMP) and Utopia® Book Inkjet Matte #45 PE paper (PE) from Appleton Coated. Properties of the resulting images were measured, including optical density (OD), mottle and strikethrough.

The optical density of these images was analyzed by using a PIAS-II image analysis system from Quality Engineering Associates (QEA), Inc. A low-resolution optical module was used on PIAS-II to record OD of each corresponding color. For each paper, OD value was reported as an average of at least three measurements taken at different spots of the drawdown images.

The mottle of these images on PE papers was analyzed using a PIAS-II image analysis system from QEA. A low-resolution optical module was used on PIAS-II to record $L^*$ value, where the mottle tile size was set to be 423.0 µm. At least three measurements were taken at different spots of the drawdown images. Examples 33, 34, 36, and 38, which contained pigment only (no additive) had $L^*$ values of 1.6, 2.2, 2.4, and 2.2 respectively. For all the images, their mottle performance was ranked based on the following criteria:

Good=$L^* \leq 1.2$;
Fair=$1.2 < L^* < 1.6$;
Poor=$L^* \geq 1.6$.

The strikethrough of these images was also analyzed by using a PIAS-II image analysis system from QEA. A low-resolution optical module was used on PIAS-II to record OD of each corresponding color on the back side of each image. For each paper, OD value was reported as an average of at least three measurements taken at different spots on the back of these drawdown images. For the pristine PE and HPMP papers, OD (cyan) values were 0.09 for both PE and HPMP, while OD (magenta or black) was 0.08 for PE and 0.07 for HPMP. For all the images, their strikethrough performance was ranked based on the value of AOD, which was defined as AOD=average OD reading from the back of the image OD reading from pristine paper:

Good=no or little strikethrough was seen (i.e., $\Delta OD \leq 0.04$);
Fair=a slight amount of strikethrough was seen (i.e., $0.04 < \Delta OD < 0.1$);
Poor=a clear strikethrough was seen (i.e., $0.1 \leq \Delta OD < 0.2$);
Worst=very bad strikethrough was seen (i.e., $\Delta OD \geq 0.2$).

The results of these tests for Examples 22-41 are listed in Table 6.

TABLE 6

| Inks | Pigment | Polymer Sample | PE Paper OD | PE Paper Mottle | PE Paper Strikethrough | HPMP paper OD | HPMP paper Strikethrough |
|---|---|---|---|---|---|---|---|
| Ex. 22 | COJ250C | Polymer-A | 1.49 | Fair | Good | 1.35 | Poor |
| Ex. 23 | COJ250C | Polymer-A | 1.56 | Good | Good | 1.49 | Fair |
| Ex. 24 | COJ250C | Polymer-A | 1.65 | Good | Good | 1.58 | Fair |
| Ex. 25 | COJ250C | Polymer-L | 1.20 | Poor | Fair | 1.12 | Poor |

TABLE 6-continued

| Inks | Pigment | Polymer Sample | PE Paper OD | PE Paper Mottle | PE Paper Strikethrough | HPMP paper OD | HPMP paper Strikethrough |
|---|---|---|---|---|---|---|---|
| Ex. 26 | COJ250C | Polymer-M | 1.11 | Poor | Poor | 1.07 | Worst |
| Ex. 27 | COJ250C | Polymer-N | 1.25 | Poor | Poor | 1.44 | Poor |
| Ex. 28 | COJ250C | Polymer-O | 1.08 | Fair | Poor | 1.07 | Worst |
| Ex. 29 | COJ250C | Polymer-P | 1.09 | Fair | Poor | 1.07 | Poor |
| Ex. 30 | COJ250C | Polymer-Q | 1.24 | Poor | Fair | 1.09 | Poor |
| Ex. 31 | COJ250C | Polymer-R | 1.16 | Fair | Fair | 1.05 | Worst |
| Ex. 32 | COJ250C | NaAL | 1.17 | Fair | Fair | 1.25 | Poor |
| Ex. 33 | COJ250C | — | 1.15 | Poor | Fair | 0.98 | Worst |
| Ex. 34 | COJ265M | — | 1.05 | Poor | Fair | 0.94 | Poor |
| Ex. 35 | COJ265M | Polymer-A | 1.42 | Good | Good | 1.43 | Good |
| Ex. 36 | COJ200 | — | 1.32 | Poor | Good | 1.16 | Poor |
| Ex. 37 | COJ200 | Polymer-A | 1.44 | Fair | Good | 1.41 | Fair |
| Ex. 38 | COJ300 | — | 1.36 | Poor | Good | 1.16 | Fair |
| Ex. 39 | COJ300 | Polymer-A | 1.50 | Good | Good | 1.51 | Fair |
| Ex. 40 | COJ300 | Polymer-L | 1.36 | Poor | Good | 1.29 | Fair |
| Ex. 41 | COJ300 | Polymer-R | 1.35 | Poor | Good | 0.96 | Worst |

For the COJ 250C series (Examples 22-33), Table 6 shows that Examples 22-24 containing amphoteric polymers having bisphosphonate functional groups, with increasing amounts of Polymer-A, showed dramatic improvement over Examples 25-33 with regard to OD, mottle and strikethrough on both PE and HPMP paper: 30-60% OD increase with significantly better mottle and much reduced strikethrough. Example 33, which is a pigment-only composition, showed low OD and poor mottle on PE paper and low OD and very bad strikethrough on HPMP paper. Meanwhile, Examples 30 and 31, which contained amphoteric polymers without any functional group having a calcium index value greater than or equal to a calcium binding index value of phenylphosphonic acid, and Ex-32, which contained NaAL only, showed little or trivial improvement over the pigment-only Example 33. The addition of carboxylic acid-stabilized polymers in Examples 25-28 at best showed little or small improvement over Example 33. Finally, Example 29, which contained non-amphoteric polymers with functional groups having a calcium index value greater than a calcium binding index value of phenylphosphonic acid, showed only a small improvement over Example 33.

A similar trend was observed for the COJ 265M-containing inks. Example 35, which has amphoteric polymers containing bisphosphonate functional groups, showed 35-52% OD increase with significantly better mottle and much reduced strikethrough on both PE and HPMP paper over the pigment-only composition Example 34.

For the black inks (COJ 200 and 300), the compositions having amphoteric polymers containing bisphosphonate functional groups (Examples 37 and 39) showed the best results with regard to OD, mottle and strikethrough on both PE and HPMP paper over Examples 36, 38 and 40-41. Example 41, which contained amphoteric polymers without any functional group having a calcium index value greater than or equal to a calcium binding index value of phenylphosphonic acid, showed little improvement on PE paper over pigment-only Example 38 but worse performance on HPMP paper. The compositions containing non-amphoteric polymers (Example 40), showed at best a small improvement over pigment-only Example 38 on both PE and HPMP papers.

Examples 42-45

Examples 42-45 are ink compositions comprising unmodified pigments. The pigment dispersions ("PigDisp") are prepared as follows.

PigDisp-A

Polymer-A (39.4 g of solution, 19.3% solids in water) was combined with 76 g of DI water and 17.8 g of Pigment Blue 15:4 (as a presscake, the amount of which was determined by its solid content). This mixture was then sonicated at approximately 10° C. with a Misonix® probe sonicator for 30 minutes to afford a low viscosity, cyan dispersion with a mean particle size of about 131 nm (determined by using a Microtrac® Particle Size Analyzer). The dispersion was centrifuged at 2,500 G for 20 minutes, and then decanted to isolate the product. A final solution of Polymer-A-dispersed cyan pigment with 14.9% solid and a mean particle size of 131 nm was obtained.

PigDisp-B

Polymer-L (59 g of solution, 22.6% solids) was combined with 201 g of DI water and 40 g of Pigment Blue 15:4 (as a presscake, the amount of which was determined by its solid content). This mixture was then sonicated at approximately 10° C. with a Misonix® probe sonicator for 1 hour to afford a low viscosity, cyan dispersion with a mean particle size of about 138 nm (determined by using a Microtrac® Particle Size Analyzer). The dispersion was centrifuged at 2,500 G for 20 minutes, and then decanted to isolate the product. A final solution of Polymer-L-dispersed cyan pigment with 14.1% solid and a mean particle size of 129 nm was obtained.

PigDisp-C

Polymer-O (73.5 g of solution, 20.4% solids) was combined with 219 g of DI water and 45 g of Pigment Blue 15:4 (as a presscake, the amount of which was determined by its solid content). This mixture was then sonicated at approximately 10° C. with a Misonix® probe sonicator for 1.5 hour to afford a low viscosity, cyan dispersion with a mean particle size of about 182 nm (determined by using a Microtrac® Particle Size Analyzer). The dispersion was centrifuged at 2,500 G for 20 minutes, and then decanted to isolate the product. A final solution of Polymer-O-dispersed cyan pigment with 12.3% solid and a mean particle size of 167 nm was obtained.

PigDisp-D

Polymer-P (104.6 g of solution, 14.3% solid) was combined with 188 g of DI water and 45 g of Pigment Blue 15:4 (as a presscake, the amount of which was determined by its solid content). This mixture was then sonicated at approximately 10° C. with a Misonix® probe sonicator for 2 hour to afford a low viscosity, cyan dispersion with a mean particle size of about 147 nm (determined by using a Microtrac® Particle Size Analyzer). The dispersion was centrifuged at 2,500 G for 20 minutes, and then decanted to isolate the product. A final solution of Polymer-P-dispersed cyan pigment with 13.2% solid and a mean particle size of 150 nm was obtained.

PigDisp-E

Polymer-B (69.3 g of solution, 11.4% solid) was combined with 32 g of DI water and 17.8 g of Pigment Red 122 (as a presscake, the amount of which was determined by its solid content). This mixture was then sonicated at approximately 10° C. with a Misonix® probe sonicator for 0.5 h to afford a low viscosity, magenta dispersion. The dispersion was centrifuged at 2,500 G for 20 minutes, and then decanted to isolate the product. A final solution of Polymer-B-dispersed magenta pigment with 16.9% solid and a mean particle size of 89 nm was obtained.

PigDisp-F

Polymer-A (28 g of solution, 19.3% solid) was combined with 49 g of DI water and 12.7 g of Pigment Yellow 74 (as a presscake, the amount of which was determined by its solid content). This mixture was then sonicated at approximately 10° C. with a Misonix® probe sonicator for 1 h to afford a low viscosity, yellow dispersion. The dispersion was centrifuged at 2,500 G for 20 minutes, and then decanted to isolate the product. A final solution of Polymer-A-dispersed yellow pigment with 18.7% solid and a mean particle size of 172 nm was obtained.

PigDisp-G

Polymer-A (22.8 g of solution, 19.3% solid) was combined with 67 g of DI water and 10 g of Black Pearls 700 (from Cabot Corporation). This mixture was then sonicated at approximately 10° C. with a Misonix® probe sonicator for 0.5 h to afford a low viscosity, black dispersion. The dispersion was centrifuged at 2,500 G for 20 minutes, and then decanted to isolate the product. A final solution of Polymer-A-dispersed black pigment with 14.3% solid and a mean particle size of 151 nm was obtained.

Ink Compositions and Ink Evaluation

Ink compositions (Examples 42-45) were prepared from the pigment dispersions PigDisp A-D. Table 7 lists the components of the inks with amounts listed are in weight percent of the final ink composition. The pigment dispersions are quoted on a pigment solid basis.

TABLE 7

| Component | Ex. 42 | Ex. 43 | Ex. 44 | Ex. 45 |
|---|---|---|---|---|
| PigDisp-A | 2.1% | | | |
| PigDisp-B | | 2.1% | | |
| PigDisp-C | | | 2.1% | |
| PigDisp-D | | | | 2.1% |
| Glycerol | 20% | 20% | 20% | 20% |
| Surfynol 465 | 1% | 1% | 1% | 1% |
| TEA/Acetate | 1% | 1% | 1% | 1% |
| Proxel GXL | 0.1% | 0.1% | 0.1% | 0.1% |
| Water | balance | balance | balance | balance |

The inks were evaluated as described above via drawdown experiments on various papers. The test results of these inks with regard to OD, mottle and strikethrough on both PE and HPMP papers were acquired by the methods used for ink Examples 22-41, and summarized in Table 8.

TABLE 8

| Inks | Pigment Dispersion | Polymeric dispersant | PE Paper | | | HPMP paper | |
|---|---|---|---|---|---|---|---|
| | | | OD | Mottle | Strikethrough | OD | Strikethrough |
| Ex. 42 | PigDisp-A | Polymer-A | 1.60 | Good | Good | 1.50 | Fair |
| Ex. 43 | PigDisp-B | Polymer-L | 1.36 | Poor | Good | 1.31 | Poor |
| Ex. 44 | PigDisp-C | Polymer-O | 1.27 | Poor | Good | 1.19 | Poor |
| Ex. 45 | PigDisp-D | Polymer-P | 1.28 | Poor | Good | 1.14 | Poor |

As shown in Table 8, ink Example 42 provides high OD, good mottle, and good strikethrough on PE paper and high OD and fair strikethrough performance on HPMP paper, where Polymer-A, an amphoteric polymer containing bisphosphonate functional groups, was used as a dispersant. In contrast, Ex-43 to Ex-45 showed much lower OD and worse mottle on PE and lower OD and worse strikethrough on HPMP paper, where Polymer-L, Polymer-O, and Polymer-P were used as polymeric dispersants.

Examples 46-57

Examples 46-51 and 53-56 are ink compositions comprising polymer examples, Polymer-E, Polymer-G to Polymer-K, which are amphoteric and contain bisphosphonate groups.

Ink Compositions and Ink Evaluation

Table 9 lists the pigments and additive components, and resulting print data for Examples 46-57, and Table 5 lists the ink components common to each composition. These inks were evaluated as described above via drawdown experiments on various papers. The test results of these inks with regard to mottle on PE paper were acquired by the method used for ink Examples 22-41. The test results of these inks with regard to OD on both PE and HPMP paper were analyzed by using an X-rite 530 spectrophotometer. The following settings were used: Illumination at D65, 2 degree Standard Observer, DIN density standard, white base set to Abs, and no filter. For each paper, OD value was reported as an average of at least three measurements taken at different spots of the drawdown images.

TABLE 9

| Example | Polymer | Polymer wt % | Pigment | Pigment wt % | PE Paper OD | PE Paper Mottle | HPMP Paper OD |
|---|---|---|---|---|---|---|---|
| 46 | Polymer-E | 0.42 | COJ250C | 2.1 | 1.25 | Good | 1.18 |
| 47 | Polymer-G | 0.42 | COJ250C | 2.1 | 1.27 | Fair | 1.05 |
| 48 | Polymer-H | 0.42 | COJ250C | 2.1 | 1.23 | Fair | 1.02 |
| 49 | Polymer-I | 0.42 | COJ250C | 2.1 | 1.25 | Good | 1.19 |
| 50 | Polymer-J | 0.42 | COJ250C | 2.1 | 1.28 | Good | 1.19 |
| 51 | Polymer-K | 0.42 | COJ250C | 2.1 | 1.26 | Good | 1.16 |
| 52 | — | | COJ250C | 2.1 | 1.03 | Poor | 0.87 |
| 53 | Polymer-E | 0.84 | COJ265M | 4.2 | 1.36 | Good | 1.28 |
| 54 | Polymer-G | 0.84 | COJ265M | 4.2 | 1.48 | Good | 1.20 |
| 55 | Polymer-J | 0.84 | COJ265M | 4.2 | 1.39 | Good | 1.30 |
| 56 | Polymer-K | 0.84 | COJ265M | 4.2 | 1.38 | Good | 1.29 |
| 57 | — | | COJ265M | 4.2 | 1.05 | Poor | 0.91 |

As shown in Table 9, ink Examples 46-51 and ink Examples 53-56 provide high OD and good mottle on PE paper and high OD on HPMP paper, where Polymer-E, Polymer-G to Polymer-K, an amphoteric polymer containing bisphosphonate functional groups like Polymer-A in ink Examples 22-24 and Example 35, were used as additives. In contrast, Ex-52 and Ex-57, which are pigment-only compositions, showed very low OD and poor mottle performance.

Examples 58-69

Examples 58-61 are ink compositions comprising modified pigment only, while Examples 62-65 are ink compositions comprising modified pigment and Polymer-A, which is amphoteric and contains bisphosphonate groups. Examples 66-69 are ink compositions comprising PigDisp-A, PigDisp-E, PigDisp-F, and PigDisp-G, respectively, where these are unmodified pigments dispersed by Polymer-A or Polymer-B.

Ink Compositions and Ink Evaluation

Table 10 lists the components of the inks with amounts listed are in weight percent of the final ink composition with the balance being water. The pigment dispersions are quoted on a pigment solid basis.

TABLE 10

| | Ex. 58 | Ex. 59 | Ex. 60 | Ex. 61 | Ex. 62 | Ex. 63 | Ex. 64 | Ex. 65 | Ex. 66 | Ex. 67 | Ex. 68 | Ex. 69 |
|---|---|---|---|---|---|---|---|---|---|---|---|---|
| COJ250C | 4% | | | | 4% | | | | | | | |
| COJ265M | | 5.5% | | | | 5.5% | | | | | | |
| COJ270Y | | | 5% | | | | 5% | | | | | |
| COJ300 | | | | 4% | | | | 4% | | | | |
| Polymer-A | | | | | 0.8% | 1.1% | 1% | 0.8% | | | | |
| PigDisp-A | | | | | | | | | 4% | | | |
| PigDisp-E | | | | | | | | | | 5.5% | | |
| PigDisp-F | | | | | | | | | | | 5% | |
| PigDisp-G | | | | | | | | | | | | 4% |
| Glycerol | 10% | 10% | 10% | 10% | 10% | 10% | 10% | 10% | 10% | 10% | 10% | 10% |
| Surfynol 465 | 1% | 1% | 1% | 1% | 1% | 1% | 1% | 1% | 1% | 1% | 1% | 1% |
| TEGmBE | 5% | 5% | 5% | 5% | 5% | 5% | 5% | 5% | 5% | 5% | 5% | 5% |
| water | | | | | | balance | | | | | | |

All inks were printed via EPSON C88 printer on both HPMP and PE paper at normal mode. The optical density of these images was analyzed by using an X-rite 530 spectrophotometers. The following settings were used: Illumination at D65, 2 degree Standard Observer, DIN density standard, white base set to Abs, and no filter. The OD data is listed in Table 11.

TABLE 11

| Inks | Pigment | Polymer | OD PE | OD HPMP |
|---|---|---|---|---|
| Ex. 58 | COJ250C | — | 0.99 | 1.00 |
| Ex. 59 | COJ265M | — | 0.89 | 0.89 |
| Ex. 60 | COJ270Y | — | 0.86 | 0.78 |
| Ex. 61 | COJ300 | — | 1.28 | 1.11 |
| Ex. 62 | COJ250C | Polymer-A | 1.23 | 1.13 |
| Ex. 63 | COJ265M | Polymer-A | 1.04 | 0.99 |
| Ex. 64 | COJ270Y | Polymer-A | 0.94 | 0.89 |
| Ex. 65 | COJ300 | Polymer-A | 1.48 | 1.40 |
| Ex. 66 | Pigment Blue 15:4 | Polymer-A | 1.20 | 1.12 |
| Ex. 67 | Pigment Red 122 | Polymer-B | 0.97 | 0.89 |
| Ex. 68 | Pigment Yellow 74 | Polymer-A | 0.94 | 0.89 |
| Ex. 69 | Black Pearl 700 | Polymer-A | 1.41 | 1.23 |

As shown in Table 11, ink Examples 62, 63, 64, and 65 provided higher OD on both PE and HPMP paper, where Polymer-A, an amphoteric polymer containing bisphosphonate functional groups, was used as additives, than the corresponding colors of the comparative ink Examples 58, 59, 60 and 61, respectively. Meanwhile, ink Examples 66-69, where Polymer-A or Polymer-B was used to disperse unmodified pigments, showed high OD on both PE and HPMP paper.

Examples 70-78

Examples 70-78 describe the preparation of polymer-stabilized dispersions containing amphoteric polymers, and their relative sensitivity to $Ca^{2+}$ ions.

The pigments used in Examples 70-77 are Pro-Jet™ aqueous pigment dispersions, where carbon black and organic pigments are stabilized by using conventional polymeric dispersants, and all available commercially as pigment dispersions from FUJIFILM Imaging Colorants, Inc., and sold as Pro-Jet™ APD1000 dispersions (APD1000 black, APD1000 cyan, APD1000 magenta, and APD1000 yellow).

The pigment used in Example 78 is PigDisp H, an aqueous dispersion comprising amphoteric-polymer attached pigments. PigDisp H is prepared as follows.

PigDisp-H

A NaAL solution was prepared by dissolving sodium alendronate trihydrate (15.6 parts) in 288 ml of 0.5 M NaOH. To this stirred mixture was added PPG-DGE (27.8 parts, Mn 638 g/mol), followed by 144 ml of IPA. The resultant mixture was heated at 75° C. for 16 h. During this time, the initial hazy mixture became clear and homogeneous. After cooling to room temperature, the solution was transferred to an evaporation flask and the reaction flask further rinsed with DI water and also added to the evaporation flask. Volatiles were removed in vacuo at 40° C./40 torr until IPA was effectively removed. The pH was adjusted by stirring the solution at 40-50° C. in the presence of an acid resin from an initial value of 11.7 until the pH was 9.7. Suction filtration through a glass frit to remove the ion exchange beads afforded a clear, colorless liquid: 16.2% solids. 1H NMR was used to determine its number average molecular weight: 6800 g/mole. These polymers were end-capped with secondary amino groups.

An APSES-modified cyan dispersion at 25.2% solid was prepared by a diazonium reaction of Pigment Blue 15:4 press cake with 2-(4-aminophenyl)sulfonylethyl hydrogen sulfate (i.e., APSES; 0.3 mmole APSES per gram of dry pigment; the APSES-modified pigment dispersion was prepared according to the methods disclosed in U.S. Pat. Nos. 6,723,783 and 8,858,695, the disclosures of which are incorporated herein by reference). To this stirred solution was added 46.6 g of the above amphoteric polymer solution and the resultant mixture stirred at room temperature in a stainless steel beaker. Finally, 3 g of 40% sodium hydroxide was added dropwise to give a final pH of 12.8. After stirring for 4 hours at room temperature, the mixture was diluted with DI water and purified by diafiltration using a 500,000 MW cut-off polysulfone membrane. This afforded 127 g of dispersion: pH 10.5; 16.9% solid.

The Ca-sensitivity test was conducted by adding one drop (ca. 0.05 g) of the dispersion Examples 70-78 into a series of 25 mL $CaCl_2$ solutions with varied levels of molar concentrations: 0.50 mM, 1.0 mM, 2.5 mM, 5 mM, 10 mM, and 50 mM. Upon the addition of dispersion, the lowest molar concentration of $CaCl_2$ was recorded when the immediate precipitation of pigment dispersion was observed. After testing all these examples, their $CaCl_2$ molar concentrations, at which pigments started precipitating, were summarized in Table 12. The lower the $CaCl_2$ concentration required for precipitation, the greater the sensitivity towards calcium, which can indicate capability for calcium binding.

TABLE 12

| Example | Additive | Additive (wt %) | Pigment Dispersion | Pigment (wt %) | [CaCl$_2$], mM |
|---|---|---|---|---|---|
| 70 | — | — | ADP1000 Black | 5.0 | 10 |
| 71 | Polymer-F | 1 | ADP1000 Black | 4.0 | 2.5 |
| 72 | — | — | ADP1000 cyan | 5.0 | 10 |
| 73 | Polymer-F | 1 | ADP1000 cyan | 4.0 | 2.5 |
| 74 | — | — | ADP1000 magenta | 5.0 | 10 |
| 75 | Polymer-F | 1 | ADP1000 magenta | 4.0 | 2.5 |
| 76 | — | — | ADP1000 yellow | 5.0 | 10 |
| 77 | Polymer-F | 1 | ADP1000 yellow | 4.0 | 2.5 |
| 78 | — | — | PigDisp H cyan dispersion | 4.0 | 1.0 |

From Table 12, it can be seen that the calcium sensitivity of polymer-stabilized pigment dispersions was dramatically improved when Polymer-F was added. Meanwhile, the amphoteric-polymer attached pigment dispersion, PigDisp H, exhibited a very high Ca-sensitivity.

The use of the terms "a" and "an" and "the" are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The invention claimed is:

1. A polymer comprising the repeat units (A), (B), and (C), wherein:
    (A) is selected from N(R$_1$) and —N$^+$(R$_1$)(R$_2$)—;
    (B) is selected from C$_1$-C$_{10}$ alkylene; C$_3$-C$_{20}$ cycloalkylene; C$_3$-C$_{20}$ heterocycloalkylene; arylene; heteroarylene; C$_2$-C$_{20}$ ether; C$_2$-C$_{20}$ thioether; C$_2$-C$_{20}$ ester; C$_2$-C$_{20}$ acetal; C$_2$-C$_{20}$ amide; bisphenols; and oligomer and polymer moieties selected from polyether, polyester, polyamines, polycarbonate, polyacetal, polythioether, polyester amide, polyurethane, polyacrylate, polyolefin, and polyalkylsiloxane,
    (C) comprises at least one group selected from:
        (i) —C(R$_3$)(R$_4$)—C(R$_5$)(OH)—(C(R$_6$)(R$_7$))$_m$—,
        (ii) —C(R$_3$)(R$_4$)—C(R$_5$)(H)—C(O)—, and
        (iii) —C(R$_3$)(R$_4$)—C(R$_5$)(H)—S(O)(O)—; and
    (A) is bonded to the —C(R$_3$)(R$_4$)— group of (C),
    (B) is bonded to (C),
    R$_1$ is selected from C$_1$-C$_{10}$ alkyl, C$_4$-C$_{18}$ aryl, C$_4$-C$_{18}$ heteroaryl, and C$_3$-C$_{20}$ heterocycloalkyl, each being substituted with at least one functional group; R$_2$ is selected from H, C$_1$-C$_{10}$ alkyl, C$_4$-C$_{18}$ aryl, C$_1$-C$_{10}$ alkyl substituted with at least one functional group, and C$_4$-C$_{18}$ aryl substituted with at least one functional group, wherein R$_1$, or R$_1$ and R$_2$ together, has a calcium index value greater than or equal to a calcium index value of phenylphosphonic acid,
    m is an integer ranging from 0-10, and
    R$_3$-R$_7$ are each independently selected from H; C$_1$-C$_{10}$ alkyl; and C$_4$-C$_{18}$ aryl.

2. The polymer of claim 1, wherein (B) is bonded to (C) via linker group X, wherein X is selected from O, N(R$_8$), C(R$_9$)(R$_{10}$), and O—C(R$_9$)(R$_{10}$), and R$_8$-R$_{10}$ are each independently selected from H; C$_1$-C$_{10}$ alkyl; and C$_4$-C$_{18}$ aryl.

3. The polymer of claim 2, wherein (B) is bonded to two (C) repeat units via respective X groups, X$_1$ and X$_2$, such that the polymer comprises the repeat unit:

C-X$_1$-B-X$_2$-C wherein X$_1$ and X$_2$ are independently selected from O, N(R$_8$), C(R$_9$)(R$_{10}$), and O—C(R$_9$)(R$_{10}$).

4. The polymer of claim 1, wherein (B) is bonded to two different (C) repeat units, such that the polymer comprises the repeat unit C$_1$-B-C$_2$.

5. The polymer of claim 2, wherein the polymer comprises at least one repeat unit selected from:
—C(R$_3$)(R$_4$)—C(R$_5$)(OH)—(C(R$_6$)(R$_7$))$_m$-B-X-(C(R$_{11}$)(R$_{12}$))$_m$—C(R$_{13}$)(OH)—C(R$_{14}$)(R$_{15}$)—,
—C(R$_3$)(R$_4$)—C(R$_5$)(OH)—(C(R$_6$)(R$_7$))$_m$-X-B-(C(R$_{11}$)(R$_{12}$))$_m$—C(R$_{13}$)(OH)—C(R$_{14}$)(R$_{15}$)—,
—C(R$_3$)(R$_4$)—C(R$_5$)(OH)—(C(R$_6$)(R$_7$))$_m$-X$_1$-B-X$_2$-(C(R$_{11}$)(R$_{12}$))$_m$—C(R$_{13}$)(OH)—C(R$_{14}$)(R$_{15}$)—,
—C(R$_3$)(R$_4$)—C(R$_5$)(H)—C(O)-B-X-C(O)—C(R$_{11}$)(H)—C(R$_{12}$)(R$_{13}$)—,
—C(R$_3$)(R$_4$)—C(R$_5$)—(H)—C(O)-X-B-C(O)—C(R$_{11}$)(H)—C(R$_{12}$)(R$_{13}$)—,
—C(R$_3$)(R$_4$)—C(R$_5$)(H)—C(O)-X$_1$-B-X$_2$-C(O)—C(R$_{11}$)(H)—C(R$_{12}$)(R$_{13}$)—,
—C(R$_3$)(R$_4$)—C(R$_5$)(H)—S(O)(O)-B-X-S(O)(O)—C(R$_{11}$)(H)—C(R$_{12}$)(R$_{13}$)—,
—C(R$_3$)(R$_4$)—C(R$_5$)(H)—S(O)(O)-X-B-S(O)(O)—C(R$_{11}$)(H)—C(R$_{12}$)(R$_{13}$)—,
—C(R$_3$)(R$_4$)—C(R$_5$)(H)—S(O)(O)-X$_1$-B-X$_2$-S(O)(O)—C(R$_{11}$)(H)—C(R$_{12}$)(R$_{13}$)—,
—C(R$_3$)(R$_4$)—C(R$_5$)(OH)—(C(R$_6$)(R$_7$))$_m$-B-X-C(O)—C(R$_{11}$)(H)—C(R$_{12}$)(R$_{13}$)—,
—C(R$_3$)(R$_4$)—C(R$_5$)(OH)—(C(R$_6$)(R$_7$))$_m$-X-B-C(O)—C(R$_{11}$)(H)—C(R$_{12}$)(R$_{13}$)—,
—C(R$_3$)(R$_4$)—C(R$_5$)(OH)—(C(R$_6$)(R$_7$))$_m$-X$_1$-B-X$_2$-C(O)—C(R$_{11}$)(H)—C(R$_{12}$)(R$_{13}$)—,
—C(R$_3$)(R$_4$)—C(R$_5$)(OH)—(C(R$_6$)(R$_7$))$_m$-B-X-S(O)(O)—C(R$_{11}$)(H)—C(R$_{12}$)(R$_{13}$)—,
—C(R$_3$)(R$_4$)—C(R$_5$)(OH)—(C(R$_6$)(R$_7$))$_m$-X-B-S(O)(O)—C(R$_{11}$)(H)—C(R$_{12}$)(R$_{13}$)—, and
—C(R$_3$)(R$_4$)—C(R$_5$)(OH)—(C(R$_6$)(R$_7$))$_m$-X$_1$-B-X$_2$-S(O)(O)—C(R$_{11}$)(H)—C(R$_{12}$)(R$_{13}$)—,
wherein R$_{11}$-R$_{15}$ are each independently selected from H; C$_1$-C$_{10}$ alkyl; and C$_4$-C$_{18}$ aryl; wherein X$_1$ and X$_2$ are independently selected from O, N(R$_8$), C(R$_9$)(R$_{10}$), and O—C(R$_9$)(R$_{10}$).

6. The polymer of claim 1, wherein the polymer comprises both —N(R$_1$)— and —N$^+$(R$_1$)(R$_2$)— as repeat unit (A).

7. The polymer of claim 1, wherein (C) is derived from: diglycidyl ethers of repeat unit (B), from α,β-unsaturated carbonyl derivatives of repeat unit (B), or α,β-unsaturated sulfonyl derivatives of repeat unit (B).

8. The polymer of claim 1, wherein the at least one functional group comprises at least one ionic group, at least one ionizable group, or mixtures thereof.

9. The polymer of claim 1, wherein the at least one functional group is selected from at least one phosphonic acid group, partial esters thereof, and salts thereof.

10. The polymer of claim 1, wherein the at least one functional group is selected from at least two phosphonic acid groups, partial esters thereof, and salts thereof.

11. The polymer of claim 1, wherein the at least one functional group is selected from at one geminal bisphosphonic acid group, partial esters thereof, and salts thereof.

12. The polymer of claim 1, wherein the at least one functional group is selected from —C(OH)(PO$_3$H$_2$)$_2$, —CH$_2$C(OH)(PO$_3$H$_2$)$_2$, —CH$_2$CH$_2$C(OH)(PO$_3$H$_2$)$_2$, —CH$_2$CH$_2$CH$_2$C(OH)(PO$_3$H$_2$)$_2$, —CH(PO$_3$H$_2$)$_2$, —CH$_2$CH(PO$_3$H$_2$)$_2$, partial esters thereof, and salts thereof.

13. The polymer of claim 1, wherein the at least one functional group comprises an acid.

14. The polymer of claim 13, wherein the acid comprises at least one group selected from —COOH, SO$_3$H, —OSO$_3$H, —HPO$_3$H, —OPO$_3$H, and —PO$_3$H.

15. The polymer of claim 1, wherein the polymer has an acid number of at least 30, wherein acid number is defined as:

AN=(moles of acid-containing monomer)×56.1 mg KOH/mol×n×1000/(the total mass (g) of polymer sample), where n=number of moles of ionizable protons per moles of acid-containing monomer.

16. The polymer of claim 15, wherein the number of (A) repeat units in the polymer is indicated by an amine number defined as:

AmineNum=moles of amino-containing monomer× 56.1 mg KOH/mol×n×1000/(the total mass (g) of polymer sample), where n=number of moles of basic nitrogens per moles of monomer, and wherein the amine number is at least 25.

17. The polymer of claim 16, wherein acid number is greater than amine number.

18. The polymer of claim 1, wherein the polymer further comprises a repeat unit having the formula:

D-C-B-C wherein repeat unit (D) is bonded to the —C(R$_3$)(R$_4$)— group of (C), and wherein (D) is selected from amines, polyamines, thioethers, and polythioethers.

19. The polymer of of claim 18, wherein repeat unit (D) does not contain a functional group having a calcium index value greater than or equal to a calcium index value of phenylphosphonic acid.

20. The polymer of claim 1, wherein the polymer is crosslinked.

21. A dispersion comprising the polymer of claim 1, wherein the dispersion further comprises a pigment and a liquid vehicle.

22. An inkjet ink composition comprising:
a pigment;
a liquid vehicle; and
polymer comprising the repeat units (A), (B), and (C), wherein:
(A) is selected from —N(R$_1$)— and —N$^+$(R$_1$)(R$_2$)—;
(B) is selected from C$_1$-C$_{10}$ alkylene; C$_3$-C$_{20}$ cycloalkylene; C$_3$-C$_{20}$ heterocycloalkylene; arylene; heteroarylene; C$_2$-C$_{20}$ ether; C$_2$-C$_{20}$ thioether; C$_2$-C$_{20}$ ester; C$_2$-C$_{20}$ acetal; C$_2$-C$_{20}$ amide; bisphenols; and oligomer and polymer moieties selected from polyether, polyester, polyamines, polycarbonate, polyacetal, polythioether, polyester amide, polyurethane, polyacrylate, polyolefin, and polyalkylsiloxane,
(C) comprises at least one group selected from:
(i) —C(R$_3$)(R$_4$)—C(R$_5$)(OH)—(C(R$_6$)(R$_7$))$_m$—,
(ii) —C(R$_3$)(R$_4$)—C(R$_5$)(H)—C(O)—, and
(iii) —C(R$_3$)(R$_4$)—C(R$_5$)(H)—S(O)(O)—; and
(A) is bonded to the —C(R$_3$)(R$_4$)— group of (C), (B) is bonded to (C), $R_1$ is selected from $C_1$-$C_{10}$ alkyl, $C_4$-$C_{18}$ aryl, $C_4$-$C_{18}$ heteroaryl, and $C_3$-$C_{20}$ heterocycloalkyl, each being substituted with at least one functional group; $R_2$ is selected from H, $C_1$-$C_{10}$ alkyl, $C_4$-$C_{18}$ aryl, $C_1$-$C_{10}$ alkyl substituted with at least one functional group, and $C_4$-$C_{18}$ aryl substituted with at least one functional group, wherein $R_1$, or $R_1$ and $R_2$ together, has a calcium index value greater than or equal to a calcium index value of phenylphosphonic acid, m is an integer ranging from 0-10, and $R_3$-$R_7$ are each independently selected from H; $C_1$-$C_{10}$ alkyl; and $C_4$-$C_{18}$ aryl.

23. A method of making a polymer comprising the repeat units (A) and (B), the method comprising:

reacting at least one monomer having the structure H-A-H with at least one second monomer comprising (B) bonded to at least one group selected from glycidyl ethers, α,β-unsaturated carbonyls, and α,β-unsaturated sulfonyls, wherein (A) is selected from —N($R_1$)— and —N$^+$($R_1$)($R_2$)—, $R_1$ is selected from $C_1$-$C_{10}$ alkyl, $C_4$-$C_{18}$ aryl, $C_4$-$C_{18}$ heteroaryl, and $C_3$-$C_{20}$ heterocycloalkyl, each being substituted with at least one functional group; $R_2$ is selected from $C_1$-$C_{10}$ alkyl, $C_4$-$C_{18}$ aryl, $C_1$-$C_{10}$ alkyl substituted with at least one functional group, and $C_4$-$C_{18}$ aryl substituted with at least one functional group, wherein $R_1$, or $R_1$ and $R_2$ together, has a calcium index value greater than or equal to a calcium index value of phenylphosphonic acid, and wherein (B) is selected from $C_1$-$C_{10}$ alkylene; $C_3$-$C_{20}$ cycloalkylene; $C_3$-$C_{20}$ heterocycloalkylene; arylene; heteroarylene; $C_2$-$C_{20}$ ether; $C_2$-$C_{20}$ ester; $C_2$-$C_{20}$ acetal; $C_2$-$C_{20}$ amide; bisphenols; and oligomer and polymer moieties selected from polyether, polyester, polyamines, polycarbonate, polyacetal, polythioether, polyester amide, polyurethane, polyolefin, and polyalkylsiloxane.

* * * * *